United States Patent [19]

Waldman

[11] Patent Number: 5,157,719
[45] Date of Patent: Oct. 20, 1992

[54] AUTOMATIC AREA CODE DIALING APPARATUS AND METHODS PARTICULARLY ADAPTED FOR CELLULAR OR OTHER TYPES OF TELEPHONE SYSTEMS

[75] Inventor: Herbert Waldman, Brooklyn, N.Y.

[73] Assignee: Advanced Cellular Telcom Corp., Hasbrouck Heights, N.J.

[21] Appl. No.: 491,933

[22] Filed: Mar. 12, 1990

[51] Int. Cl.$^5$ ............................................. H04M 1/27
[52] U.S. Cl. ................................... 379/356; 379/354; 379/355; 379/357
[58] Field of Search ............... 379/354, 355, 356, 357, 379/216

[56] References Cited

U.S. PATENT DOCUMENTS

| | | | |
|---|---|---|---|
| 4,039,761 | 8/1977 | Nicoud et al. | 379/355 X |
| 4,201,887 | 5/1980 | Burns | 379/354 X |
| 4,588,863 | 5/1986 | Ress | 379/355 |
| 4,800,582 | 1/1989 | D'Agosto, III et al. | 379/354 X |
| 4,928,302 | 5/1990 | Kaneuchi et al. | 379/355 X |
| 4,947,422 | 8/1990 | Smith et al. | 379/355 X |

Primary Examiner—James L. Dwyer
Assistant Examiner—M. Shehata
Attorney, Agent, or Firm—Kirschstein, Ottinger, Israel & Schiffmiller

[57] ABSTRACT

Apparatus for eliminating the need to repeat dial the same area code on a given long distance call. The apparatus detects when a subscriber wishes to implement a long distance call. Upon detection of the start of a call, the apparatus automatically displays the last area code dialed. The subscriber if desiring the last area code merely dials seven digits. The apparatus recognizes that the subscriber has selected the last area code to cause the last area code dialed to be transmitted prior to the transmission of the seven digits thereby completing a telephone number. If the subscriber does not wish to utilize the last area code dialed he first dials a "1" and then dials in ten digits and the proper digits are transmitted with the area code digits being replaced in the area code storage memory. The apparatus is particularly adaptable for use by cellular subscribers due to the fact that it reduces the number of digits dialed, saves dialing time and is therefore inherently safer to utilize while operating a vehicle.

67 Claims, 20 Drawing Sheets

AUTOMATIC AREA CODE DIALING APPARATUS AND METHODS PARTICULARLY ADAPTED FOR CELLULAR OR OTHER TYPES OF TELEPHONE SYSTEMS

DISCLOSURE DOCUMENT INFORMATION

Disclosure Document No. 119250 dated Aug. 15, 1988 and entitled "Long Distance Phone Number Dialing Enhancement" contains information pertinent to this invention.

BACKGROUND OF THE INVENTION

This invention relates to telephone dialing apparatus and more particularly to an automatic area code dialing apparatus which enables one to forego the dialing of an area code to achieve a rapid and enhanced dialing operation.

As one can ascertain, over the past years great strides have been made in implementing the rapid dialing of telephone numbers. Thus, as one will understand, present modern systems utilize the dialing keypad consisting of a series of momentary operated dialing switches or keys. In conjunction with the keypad, the telephone subset may incorporate either touch tone or pulse dialing to enable a rapid dialing sequence. Many telephone subsets also include memories whereby one can dial a telephone number by merely accessing separate memory keys or accessing a memory location on the keypad. Thus, the prior art is cognizant of various techniques to enable more rapid and accurate dialing by a subscriber. It is, of course, understood that any technique which enables faster dialing will further enhance the operation of the telephone system.

In regard to cellular phone systems the process of dialing is extremely hazardous. Many articles have been written which describe the hazards imposed by a cellular system in enabling a driver to dial a telephone while manipulating an automobile. As one can see, this presents a potential safety hazard that can result in accidents affecting the subscriber as well as others. As the number of cellular phones increase, the problems become more severe. In this manner it is obvious that any improvement or enhancement of the dialing procedure is particularly advantageous and a valuable improvement in connection with a cellular phone system as well as a conventional phone system.

As one can further understand a dialing method which improves or enhances the dialing procedure in a cellular phone provides a tremendous asset and benefit to the cellular system.

The apparatus and methods to be described enables one to forego the dialing of an area code by selecting a previously dialed area code in lieu of redialing the same area code. In this manner the telephone user in many instances will only have to dial 7 or 8 digits instead of dialing 11 digits indicative of a typical long distance call. Thus, the system and apparatus described herein eliminates the need to repeat and dial the same area code when placing a long distance call.

As can be ascertained, certain area codes are accessed many times during the day. For example, the area codes 212, 516, 914, and 718 are various area codes in the New York metropolitan area. Anyone conducting a business within that area will have need to access the other various area codes during the course of the day. Since the system stores any new area code dialed, much additional dialing is avoided.

In an auto cellular system, when a subscriber's vehicle is outside its cellular home base area (known as Roaming) the subscriber must dial the local area code along with the phone number in order to place local calls. For example, if the subscriber's cellular home base is in New Jersey, having a 201 area code and, he is presently driving in the New York area having a 212 area code, he must, nevertheless, repeatedly dial the 212 area code in order to place local calls, despite the fact that the call's origin is in the 212 area.

This, repeat dialing of the same area code, tends to be tedious and leads to numerous dialing errors. According to the system of the invention, the 212 area code, once dialed, will be stored, thus, avoiding the need to redial the same area code on repeated successive 212 area calls.

In addition, when one calls the long distance information operator to obtain a phone number in a foreign area code location, the area code dialed to access the operator will automatically be stored, so that the caller need not repeat dial that area code upon placing the call to the foreign location. For example, if one dials the long distance information operator for a phone number in Chicago, they would dial 1-(312)555-1212. Once furnished the number, the caller would again dial 1(312) and then the number for a total of 11 digits. In using the system of the invention, the caller would not dial the digits 1-(312) again, but only the phone number, for a total of 7 digits.

An additional enhancement of the invention is realized in the case of a misdialed long distance phone number. When redialing the number, the user does not have to redial the access digit 1 and the stored area code. He dials only the 7 digits of the phone number.

OBJECTIVES

It is the primary objective of this invention to provide an apparatus which eliminates the necessity to successively redial or repeat dial the same area code. The system and methods to be described will enable a user to cause the desired area code to be automatically dialed without having to manually dial the individual digits indicative of that area code.

Further significant objectives of the inventions are to enhance driver safety during dial-out on a cellular phone while operating a motor vehicle, to not to require the cellular phone subscriber to have to successively repeat dial the local area code when placing local calls in a cellular Roaming area, to not have to repeat dial the Long Distance (L.D.) access digit 1 on successive long distance calls to the same area code, to not to have to dial the 800 access prefix when dialing an 800 number, to not have to dial Hotel L.D. access prefix digits on initiation of each long distance call placed, to not have to dial PBX L.D. access prefix digits on initiation of each L.D. call, to not to require the caller, after procurement of a long distance (LD) phone number from the L.D. information operator, to have to repeat dial the area code before dialing the given L.D. phone number, to not to have to redial the area code on a misdialed L.D. number, to provide automatic Area code "SAVE" memory means enabling a Subscriber to repeatedly access any particular area code by only a one-touch single key actuation, and to enable one-touch dialing of programmed digits by the use of a key hold-down method.

SUMMARY OF THE INVENTION

Apparatus for automatic area code dialing in telephone systems of the type employing a telephone subset having a dialer apparatus associated therewith, comprising means coupled to said telephone subset for determining the start of a long distance call, means responsive to the start of a call to display an area code to enable a user to determine whether said displayed area code is to be employed prior to the dialing of a phone number sequence of digits, means responsive to said dialed digits being less than required for said long distance call for adding to said dialed digits additional digits indicative of said displayed area code for transmission of said added and dialed digits as combined to complete said long distance call dialing sequence.

BRIEF DESCRIPTION OF THE DRAWINGS

FIG. 2A-1 is a flow chart depicting the operation of an automatic area code dialing apparatus according to the invention applicable to cellular phones and Fax machines.

FIG. 3A-1 is a flow chart depicting the operation of an automatic area code dialing apparatus according to the invention applicable to key telephones.

FIG. 4A-1 is a flow chart showing a slight modification on FIG. 2A-1 depicting an automatic (800) access logic sequence.

Figure 1:
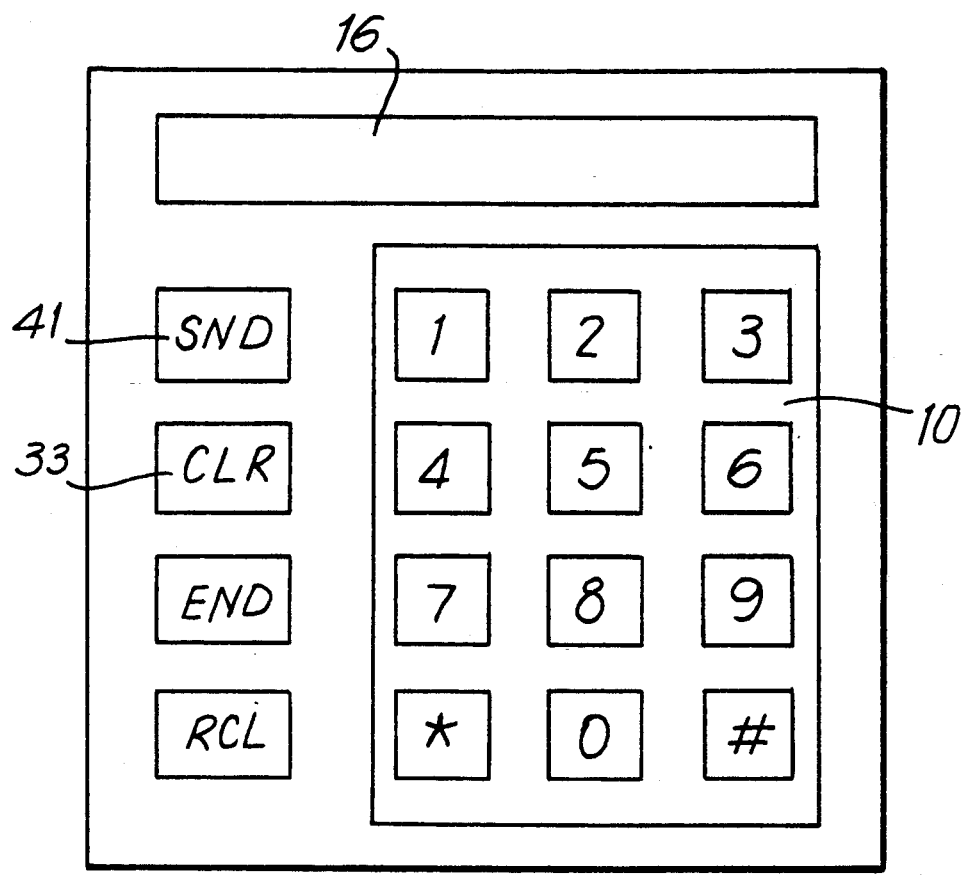
FIG. 1 is a front plan view of a typical cellular telephone subset.

| DRAWING LEGEND | | | |
|---|---|---|---|
| E | Enable | 3RE | 3-Digits Retrieve Enable |
| OE | Output Enable | 07 | Output 7 Digits |
| O | Output | 0711 | Output 7 or 11 Digits |
| D | Disable | 03 | Output 3 Digits |
| OD | Output Disable | 011 | Output 11 Digits |
| FE | Forward Enable | | |

DEFINITIONS OF TERMINOLOGY USED

In order to facilitate and simplify the drafting of the specification and the appended claims, certain descriptive language and terminology are used which it is felt defines in an understandable manner the various facets and features comprising the invention. Some of the language and terms used are not necessarily part of the industry vernacular and may not be totally conventional in their use. Accordingly, we will set forth a host of terms and define their meaning within the context of the invention.

The present system will be described in terms of conventional dialing codes utilized in the United States. It is understood that the system can be modified for various different international codes or for different telephone number sequences. In the United States, a local number is represented by 7 digits as one subscriber can access another subscriber within the local calling area by dialing in a 7 digit number. In order to dial or place a long distance call, one must first dial the digit 1 followed by a 3 digit area code and then the 7 digit number. Hence, as one can ascertain, the dialing of a long distance number involves the activation of 11 keys in a given sequence. The term dialing is synonymous with the term keying in, as both terms are used interchangeably to indicate that the subscriber keys in a digit by activating the key pad or dialer.

In the case of a Private Branch Exchange (PBX) or other type of advanced internal phone system such as used in large business establishments or in hotels, motels, etc. in addition to the Long Distance (L.D.) Access digit 1, a Line Access digit must first be keyed-in, such as, for example, a 9 for the placement of a Local outgoing call and an 8 for the placement of a L.D. call. Accordingly, it would be convenient to subdivide, in general terms, an L.D. phone number into Digit Groups and/or Digit Categories.

More specifically, the 1st Digit Group would include the L.D. access digit 1 and the three Area Code digits and, as the case may call for, in certain instances it may also include the Line Access digit or digits such as the digit 9. The 2nd Digit Group would include the 7 digits of the Local phone number following the Area Code.

Another subdivision is used by defining an L.D. number in terms of Categories as follows:

1st digit Category=Line Access digit/s—in the case of phone systems which require such initiation=L.D. Access digit e.g. 1.

2nd digit Category=Area Code digits

3rd digit Category=Local phone number (7 digits)

It should be noted here that the 7 digits of the Local phone number can be further subdivided into two subcategories, i.e., the 1st three digits identifying the Local phone Company Central Office or Exchange, and the final 4 digits being a specific Subscriber's identification within that Exchange. But, for purposes of simplification, both of these sub-categories are combined and referred to as the 3rd digit category.

Another term used is "Lead digits" or "Leading digits" This refers in a general way to the Long Distance Access digit/s and/or the Area Code digits and, in certain instances if called for, also includes the Line Access digits.

In addition, in certain applications the 3 Local Exchange Prefix digits are referred to as the Lead digits or the 1st DIGIT Group. Another term used is "Trailing digits". This refers to the digits following the Area Code digits, i.e., the 3rd Digits Category, generally the Local phone number 7 digits.

Prescribed Key—This term refers to the specific key the User is instructed to actuate in order to effect the automatic fill-in function of the 1st Digit Group or 1st and 2nd Digit Categories for as many or for as few digits, as the case may be, that is entailed in each instance.

Prescribed Actuation—This term refers to a special mode of key actuation that is called for to be executed by a User, e.g., successive Dual Key Actuation, Holddown Delayed Release Key Actuation, etc.

USE OF STATE OF THE ART ELEMENTS AND COMPONENTS

Many elements and modules of the system are well known in the state of the art and are therefore shown in block form without delving into the details of their design and construction. This approach is used in order to facilitate clarity and simplification of the specification and in order to avoid undue cluttering of the drawings where unnecessary.

Suitable discrete hardware elements can be employed to accomplish the multiple functions and features of the invention. Such discrete elements may include data storage units such as RAMS, ROMS, PROMS, as well as other type of components and circuits, such as Frequency Detection circuits, Counters, Flipflops, Registers, Comparators, Displays, all widely in use and well known in the state of the art.

Alternatively, the functions of the invention can be readily executed by the use of a suitable microprocessor chip or microcontroller I.C. and support hardware suitably programmed with software. Such microchips are readily available and are well known in the state of the art. Examples of such chips are the INTEL MCS 48 series or the NEC 7500 series.

A D.C. power supply is not shown since any suitable power supply well known in the state of the art can be used to power the various modules and the various parts of the circuitry. Phone line voltage also may be used to power the system directly as is well known in the state of the art.

The various digit detect, storing, counting and dialing modules contained in the system are in wide spread use and, as such, are well known in the state of the art. A brief descriptive outline of several of the modules used in the implementation of the invention will now follow.

MODULE 15A

Figure 2:
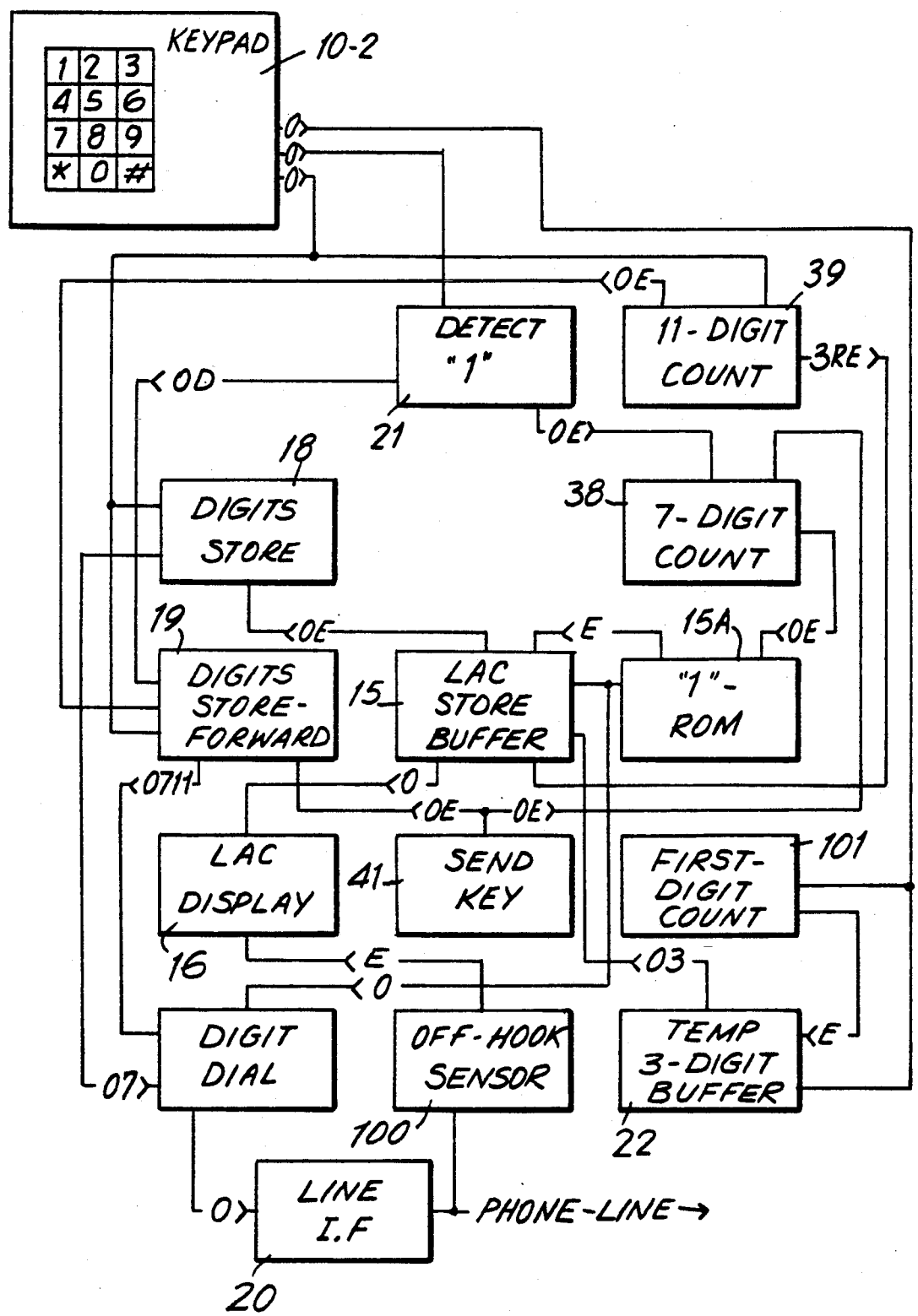
FIG. 2 is a block diagram of an automatic area code dialing apparatus according to this invention as it applies to cellular telephones.

Module 15A in FIG. 2 is a ROM which is preprogrammed with the digit 1 and upon actuation will direct the digit 1 to the Line Interface (I.F.) module 20. Module 15A will also effect actuation of the Last Area Code (LAC) Store module 15 to output the stored LAC to the Line I.F. module 20.

MODULE 15

Module 15, the Last Area Code Store Memory, in FIG. 2 is a RAM. Module 15 upon actuation serves to store the three Area Code digits keyed-in following the first keyed-in Long 1 Distance Access digit 1. Module 15 upon actuation by module 15A, will transmit the stored LAC to the phone line via I.F. 20.

MODULE 21

Module 21, the Detect 1 module, in FIG. 2 is comprised of tone frequency detection circuitry well known in the state of the art, which is designed to respond to the frequency characteristics corresponding to the DTMF digit 1 by developing an appropriate output actuating signal. Or alternatively, in the case of rotary/pulse dialing, Module 21 is designed to be a telephone line dialing pulse responsive circuit well known in the state of the art. Module 21 is designed to be operative only on the 1st digit key-in.

DETAILED DESCRIPTION OF THE DRAWINGS

Figure 1A:
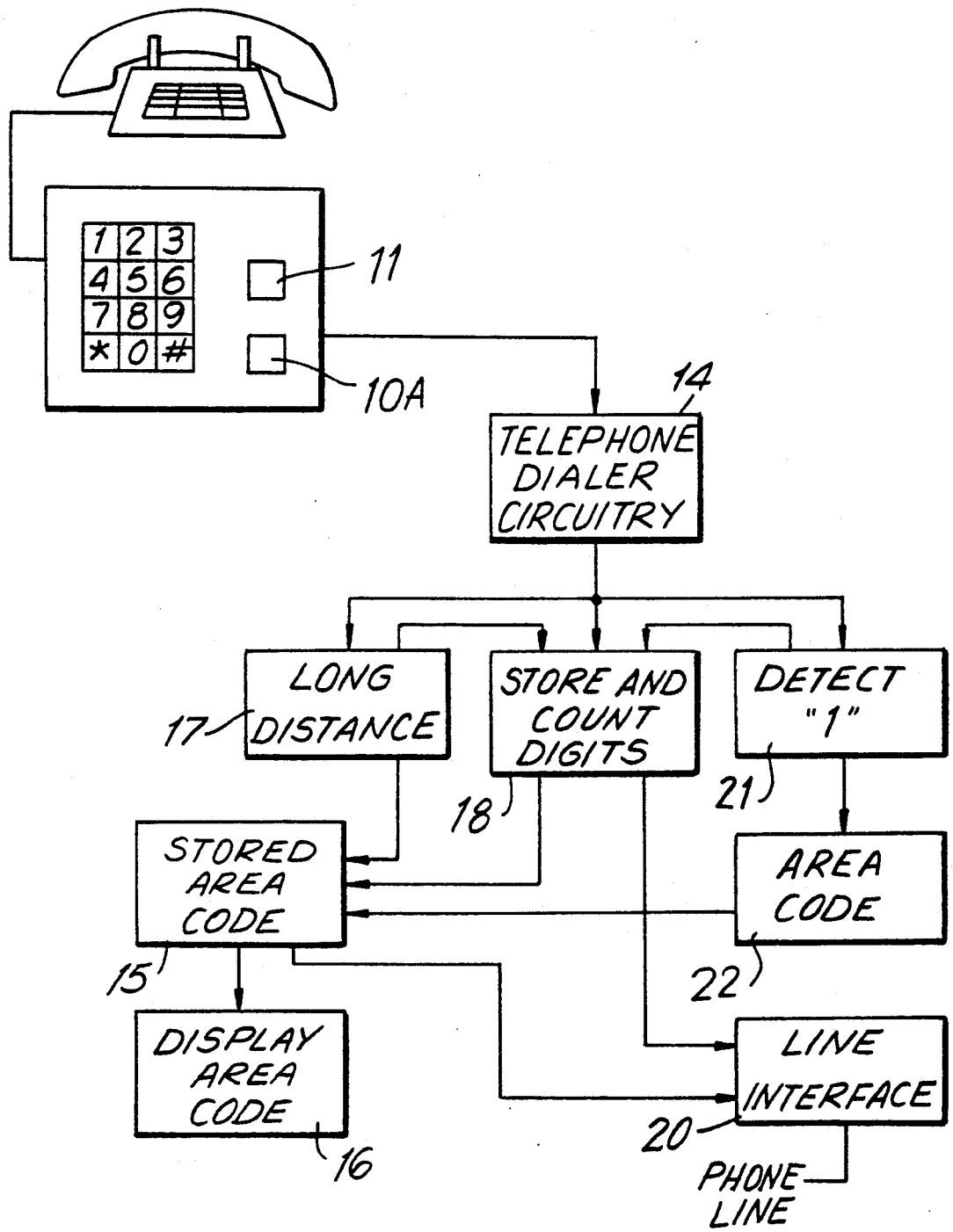
FIG. 1A is a diagram of a key telephone with associated dialer circuitry.

Referring to FIG. 1A, there is shown a telephone keypad 10A. The telephone keypad 10A is typical of existing tone dialing keypads which are presently provided on subsets. The keypad enables one to dial the digits 0-9 and further has a * and a # key. There may be many other keys located on the subset as shown for example as key 11. The telephone keypad 10A interfaces with telephone dialer or keypad circuitry 14. Such circuitry 14 exists in many different forms and is provided by many different manufacturers. The circuitry included in the telephone dialer circuitry may include memories, touch tone circuitry, etc., all of which are furnished by various manufacturers in integrated circuit form. The circuitry as shown in module 14 associated with a telephone keypad as 10A is conventional and widely known.

As indicated, an object of the present invention is to eliminate the need to repeat dial the same area code when one is making various long distance calls. Particularly, the system as will be described has great utility in regard to cellular systems due to the fact that any decrease in the amount of dialing is extremely advantageous in such systems.

The present system will be described in terms of conventional dialing codes utilized in the United States. It is understood that the system can be modified for various different international codes or for different telephone number sequences. In the United States a local number is represented by 7 digits as one subscriber can access another subscriber within the local calling area by dialing in a 7 digit number. In order to dial or place a long distance call, one must first dial the digit 1 followed by a 3 digit area code and then the 7 digit number. Hence, as one can ascertain, the dialing of a long distance number involves the activation of 11 keys in a given sequence. The term dialing is synonymous with the term keying in as both terms are used interchangeably to indicate that the subscriber keys in a digit by activating the key pad or dialer. Although the keypad 10A shown is of the tone dialing type, it should be clearly understood that the invention is, as well, applicable to Rotary/Pulse type dialing phones and keypads.

In order to achieve the desired result of the invention, i.e., —automatic "fill-in" of the desired Area Code, —the system must be advised, by some technique, of two parameters as follows:

No. 1. Whether to "fill-in" the Last Area Code (LAC) on any one particular L.D. call, No. 2. Once parameter No. 1 is in the affirmative, the system must be directed by some technique as to when to output the LAC digits on to the phone line.

The several exemplary methods to be described in the ensuing pages, illustrate a number of techniques that can be employed to satisfy these two prerequisites of the system.

Referring to FIG. 1 there is shown a diagram of a typical cellular telephone subset. The telephone subset has a display 16 which can display a multiple digit telephone number including the 1, the area code and seven digits and is associated with a keypad 10. The cellular phone also has a SEND key 41, a CLEAR key 33, an END and a RECALL key and several other keys not shown.

As one can readily ascertain, it is an object of the system to eliminate the need to repeat dial the same area code on every long distance call. Essentially and as will be further explained, as indicated in FIG. 2, when a long distance phone number is keyed in via the keypad 10-2 the three digits indicative of the area code are separately retained in a memory or buffer 15. Hence, as indicated in FIG. 2, stored in the memory or buffer 15 is the area code. Upon initiation of a subsequent call, the system will display or announce the stored area code via the display area code module 16. This can be simply implemented by actuating the display 16 and the memory 15 when the phone is placed off-hook.

If the subscriber/user desires to utilize the same area code as displayed on the display 16, then he need only actuate the digit 1 key (lead digit or first digit category) and proceed to dial the seven digits of the phone number, (trailing digit or third digit category) thereby skipping or avoiding the dialing of the three-digit area code (lead digit or second digit category) stored in memory 15.

Now, since the subscriber/user keyed-in the long distance access digit 1 as the first digit entry, the Count module 38 in cooperation with the Detect 1 module 21, will recognize that a long distance call is being placed in spite of the fact that only 7 digits, exclusive of the digit 1, were keyed-in. Upon actuation of the SEND Key 41, Module 38 will then generate an output actuating signal to module 15A. In this manner, module 15A will then activate module 15 resulting in the transmission of the 1 and the stored area code followed by the transmission of the stored digits by module 18 to the phone line interface 20—which will pulse out the proper 11 digit phone number sequence to the phone line in a manner well known in the state of the art.

Again, referring to FIG. 2, there is shown a block diagram implementation of the above-described system for a cellular subscriber. In a cellular system when a user desires to transmit a keyed-in telephone number, he must press the SEND key 41. Thus, in a cellular system, all digits entered by the subscriber are stored and when the subscriber is finished dialing, he presses the SEND key to indicate to the system that dialing is complete.

LAC DISPLAY OPERATIONAL SEQUENCE

Upon removal of the telephone handset (not shown) to initiate a dialing sequence, the off-hook Sensing module 100 is enabled in a manner well known in the state of the art. In turn, the Module 100 enables the LAC Display 16 LAC Retrieve function which now retrieves the 3 LAC digits from the LAC Store module 15, for display and viewing by the user. By utilizing appropriate circuitry, the LAC digits may continue to be displayed for the entire duration of the call, until the handset is replaced on-hook or, alternatively, may be turned off after several seconds.

Alternatively, in the case of cellular phones, it would be desirable to initiate the LAC digits display upon actuation of the phone Power ON switch and continue to maintain the stored LAC displayed continuously until the phone's power is switched-Off.

Figure 5:
FIG. 5 is a diagrammatic illustration of the LAST AREA CODE DISPLAY.
Figure 6:
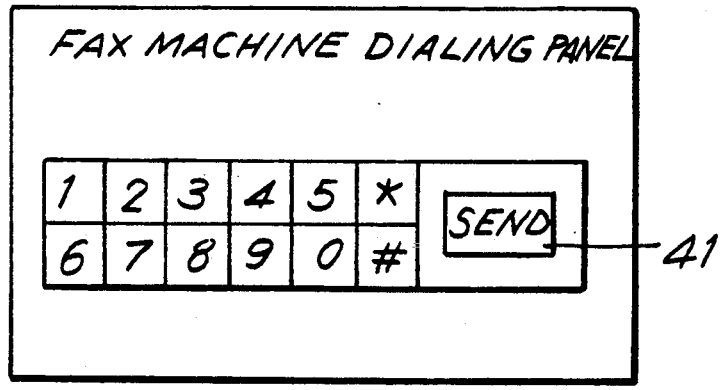
FIG. 6 is a diagrammatic illustration of a fax machine dialing panel.

From the above it is known that when a long distance number is dialed via the keypad 10-2, one generally must first dial the digit 1. This immediately informs the system that a long distance call is about to be placed. This is detected by the Detect "1" module 21 which outputs an enable signal enabling the 7 Digits Count Module 38. A circuit 21 for detecting the activation of the 1 key as a first digit dialed are well known and there exists many circuits for accommodating such results. In any event, upon detection of the 1, module 21 via module 38 thereby, also activates the module 15A Output 1 designated as the 1 ROM which in turn enables the module 15 Output 1. Stored within the memory 15 is the last area code (LAC) which was dialed by the subscriber on a previous L.D. call. As already mentioned earlier, responsive to the subscriber's removal of the telephone handset off-hook the memory module 15, in cooperation with display 16, will cause the LAC to be displayed as is illustrated in FIG. 5.

The display 16 is a conventional LCD display or other type display which can be found on many typical telephone subsets. In any event, if the subset does not have a display then such a display can be simply provided to display the last area code which was dialed. Alternatively, one can also cause the last area code to be audibly announced by means of suitable speech synthesis circuits or otherwise presented. The subscriber will immediately note what the last area code was. Speech synthesis circuits are well known in the state of the art and need not be elaborated on.

A typical example of operation will now be given. Assume for a first example that a cellular subscriber desires to use the last area code as indicated on display 16.

The subscriber, after observing that the area code on display 16 is the area code he wishes to employ, dials the digit 1 and then a 7 digit number indicative of the telephone number associated with the displayed area code. As seen in FIG. 2, there is a detect 1 module 21 which detects that the digit 1 was keyed-in as the first digit entry, thereby indicating that a long distance call is to be placed. FIG. 2 also shows a counter 38 which counts each of the digits dialed after the access digit 1 entry. Module 38 decodes the fact that the subscriber dialed in 7 digits exclusive of the access digit 1 and now activates the 1 ROM module 15A Output 1 which activates the "store last area code" module 15 Output 2, which will direct the area code digits to the telephone line I/F 20 when the subscriber actuates the SEND key 41.

The first digit entry of the access digit 1 enables the Detect 1 module 21. As the subscriber is dialing, each of the digits keyed-in following entry of the access digit 1 is stored in the digit store module 18. The store digit module 18 therefore has stored therein each of the actual phone number's 7 digits that the subscriber had keyed-in which constitute the stored telephone number. After the subscriber has completed dialing, he depresses the SEND key 41 and the system will immediately recognize that the dialing sequence is finished and via module 38 the system recognizes that only 7 digits have been dialed (exclusive of the access digit 1). Module 38, as indicated above, will, therefore, enable the 1 ROM module 15A output 2 and the stored last area code module 15 output 2. In this manner, the digit 1 and the stored last area code in module 15, as well as the stored digits (telephone number) in module 18 are directed to the Digit Dial module 14B and to the line interface 20, where they are transmitted to the cellular terminal. The cellular terminal will therefore implement a long distance telephone call based on receiving the proper number of digits. The storage digit module 18 and the store last area code module 15 are conventional components as employed in many modern telephone subsets. For example, many modern subsets as well as cellular phones conventionally store the last number dialed and, by activating a redial button, this number is automatically routed to the telephone lines.

As one can ascertain, the dialed number indicative of the digits dialed as stored in modules 15 and 18 are transmitted without the subscriber ever having to dial the displayed area code. As indicated, the above cellular system relied on the fact that the subscriber dialed a "one" to implement the start of a long distance telephone call and yet keyed-in only a total of 8 digits instead of 11 digits. The dialed 1 is detected by module 21. In contrast, in the instance wherein a user is placing a local call, since the access digit 1 was not the first digit entered, the system recognizes that a local call is being placed and accordingly does not output the stored area code to the Line I.F.20.

It is indicated that in lieu of dialing a 1, the subscriber may inform the system in other ways that a long distance call is to be made. In accordance with a preferred embodiment of the invention, the user skips the dialing of the access digit 1 when utilizing the LAC in placing long distance calls. This alternative will be more fully described in a further section of the specification.

Again, referring to FIG. 2, it is now indicated that the subscriber does not wish to utilize the last area code as displayed. The following sequence of operation occurs. The subscriber by desiring to place a L.D. call immediately dials the digit 1 which is detected by module 21. He then commences to dial a completely new area code and then keys in the seven digits of the phone number. The Store & Forward module 19 stores the 11 digits as keyed in. Since more than 7 digits were keyed-in, module 38 output does not presently enable the 1 ROM module 15A. The module 19 output is initially disabled by the Detect 1 module 21 but is again enabled at the conclusion of the dialing sequence by the 11 Digit Count Module 39. Upon the user's actuation of the prescribed key, e.g. the Send Key 41, the digits forward function of module 19 is enabled to cause the stored digits to be forwarded to the phone line via the I.F. module 20.

At the same time, the 3 digits of the new area code are now stored in the L.A.C. Store module 15. The operational sequence of this function is as follows:

After the user keys-in the access digit 1 as the first digit entry, the Temporary 3 digit module 22, responsive to the output of the First Digit Count module 101, now stores the 3 digits of the new area code. Upon completion of the dialing sequence, the 11 Digit Count Module 39 enables the Retrieve function of the L.A.C. Store module 15. Module 15 now retrieves the 3 digits from module 22 and stores them for display as the new LAC for subsequent calls. It should be pointed out that the enable function of module 15 which enables the output of the Store & Forward module 18 is presently not enabled because this function derives from module 15A which is not now enabled via module 38. Consequently, module 18 is also presently not enabled. This becomes readily apparent upon viewing FIG. 2.

During the next operation, the last area code as dialed by the subscriber and as stored in module 15 will be displayed via the display 16 when another long distance call is placed.

In the absence of any indication by the user that he desires to use the LAC in placing a long distance call, the 11 digit count module 39 via Store and Forward Module 19 will effect the dial out of the keyed-in digits via Module 14B and the telephone I F coupler module 20 as already indicated.

To place a Local call, user enters the 7 digits of the phone number. The Store module 19 stores the 7 digits as keyed-in. The Store module 19 output is presently not disabled by the Detect 1 module 21 because a 1 was not keyed-in as the 1st digit entry. Upon user's actuation of the SEND key 41, the Store module 19 Forward function is now enabled to forward the stored digits to the phone line via module 14B and the I.F. module 20.

ALTERNATE METHOD/USING DUAL ACTUATION OF SEND KEY

Figure 2A:
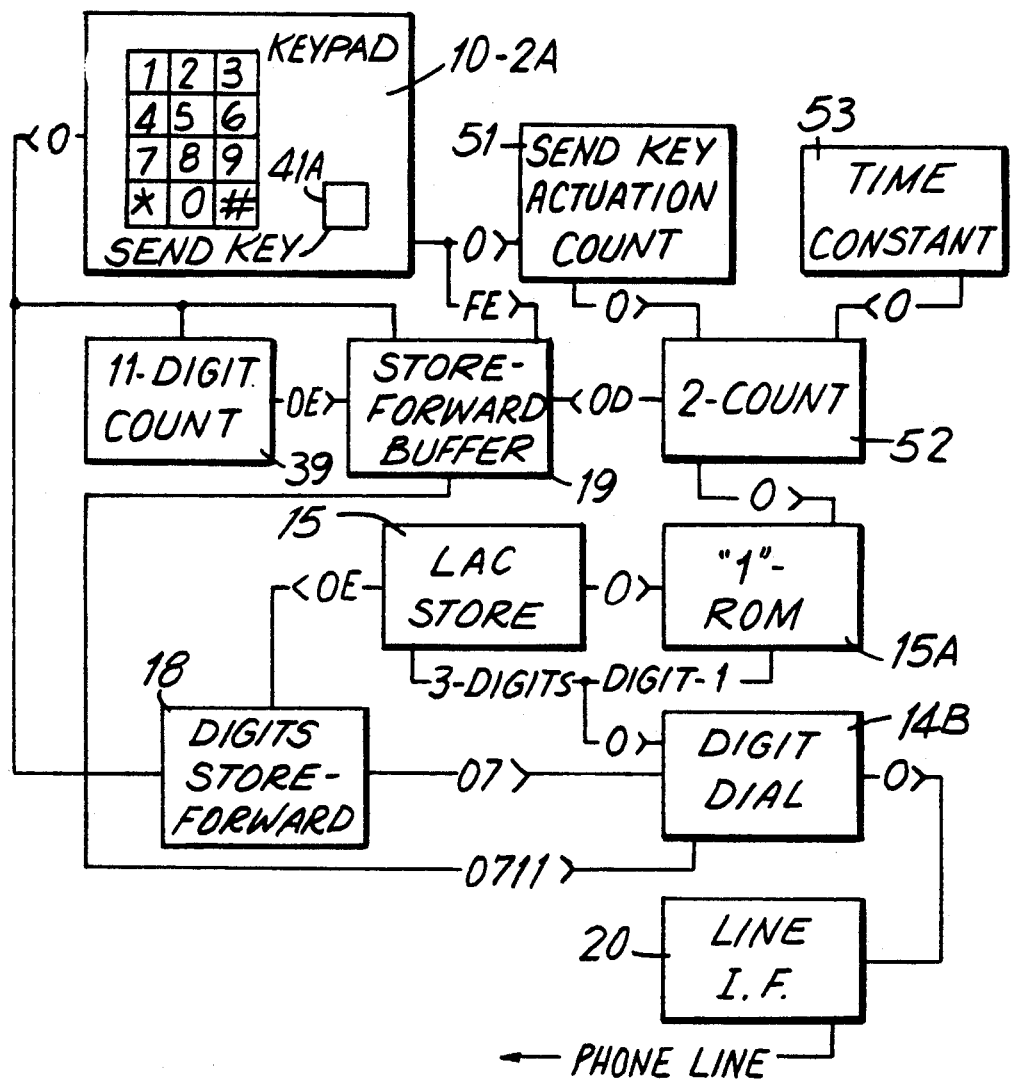
FIG. 2A is a block diagram of an alternate embodiment.
Figures 1, 2A:
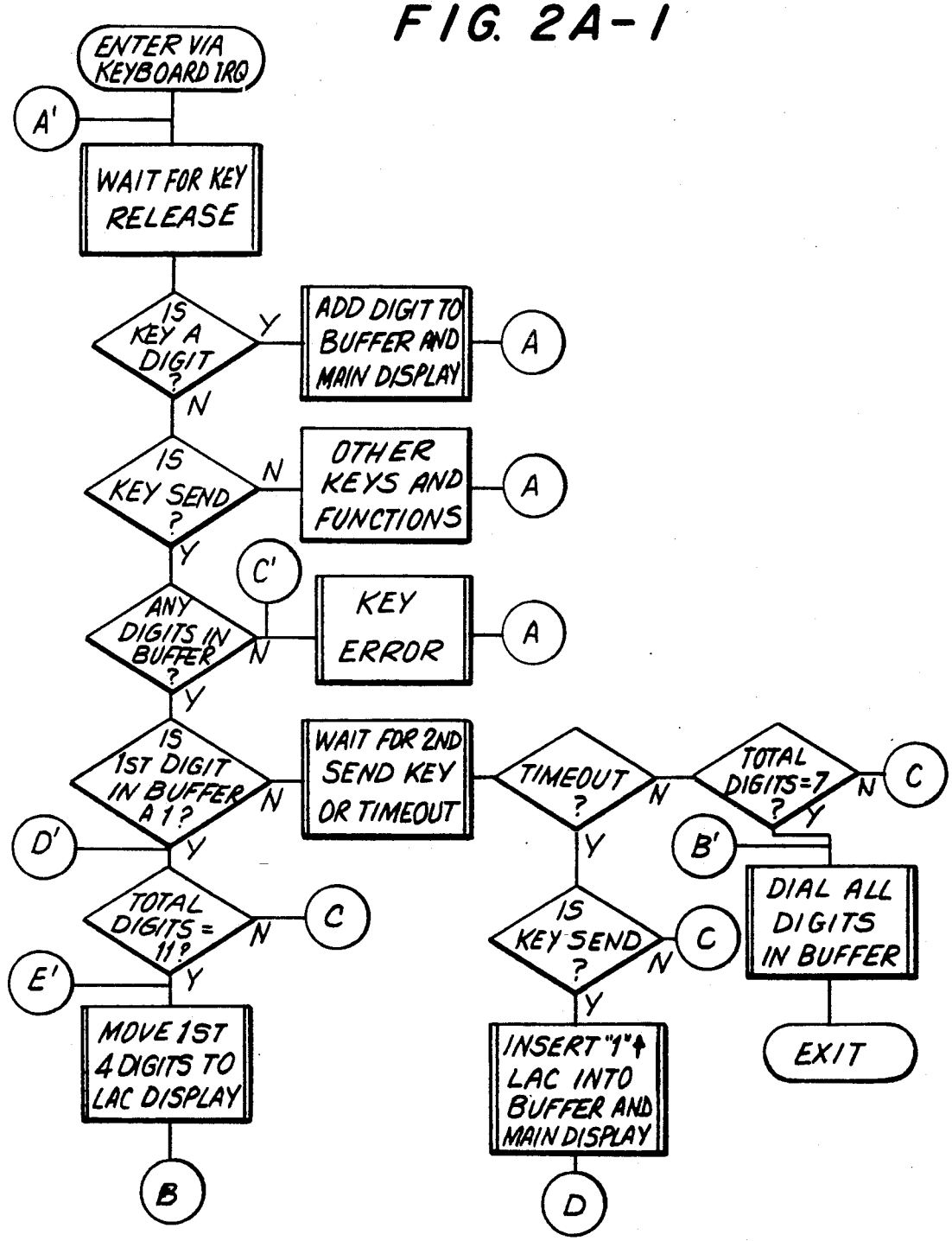

An alternate method with respect to cellular phones will now be described. With this method of operation, the user does not have to first key-in the access digit 1. Referring to FIG. 2A in conjunction with FIG. 2, a key pad 10-2A having a SEND key 41A is shown the output of which is coupled to a Key Actuation Count module 51. An Interval time constant module 53 is also shown. The operation of this embodiment will now be described.

When placing a L.D. call if the user desires to use the LAC as displayed on the Display 16, he does not first enter the access digit 1 but, rather, starts by keying-in the 7 digits of the phone number. Upon completion of the key-in sequence, the user is instructed to actuate the prescribed key, e.g., the SEND key 2 times in succession, as the prescribed actuation. The 41A, two Count module 52 in cooperation with module 51, senses this dual actuation and thereby generates an actuating output signal to the 1 ROM module 15A which in turn outputs the access digit 1 to the phone line over module 14B and 20 and also activates the LAC Store module 15. Module 15 now outputs the 3 LAC digits to the phone line (also over modules 14B and module 20) and also activates the output of the Store and Forward module 18 which now outputs the 7 phone number digits to the phone line again over module 14B and module 20. Thus, the L.D. call has now been placed without the user having to key-in the full 11 digits but, rather, only keying-in 7 digits. In this configuration the 7 Digit Count module 38 (see FIG. 2) is not used.

The Time Consrant module 53 is of a conventional timing circuitry and serves to establish the allowable time interval window for the dual actuation sequence of the SEND key in order to be considered valid.

Figure 10:
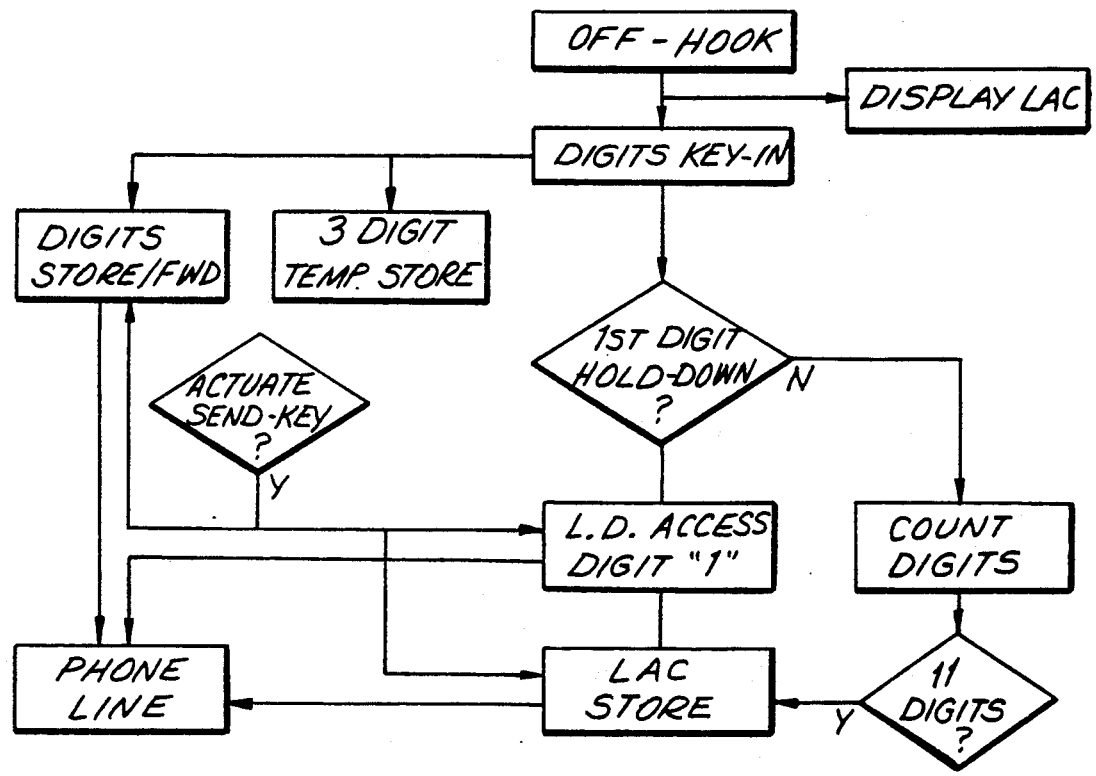
FIG. 10 is a flow chart depicting the operation of an automatic area code dialing apparatus according to an alternate embodiment of the invention.

The Logic sequence of this method (with some variations) can be followed in the Flow Charts shown in FIGS. 10 and 2A-1.

Figure 2B:
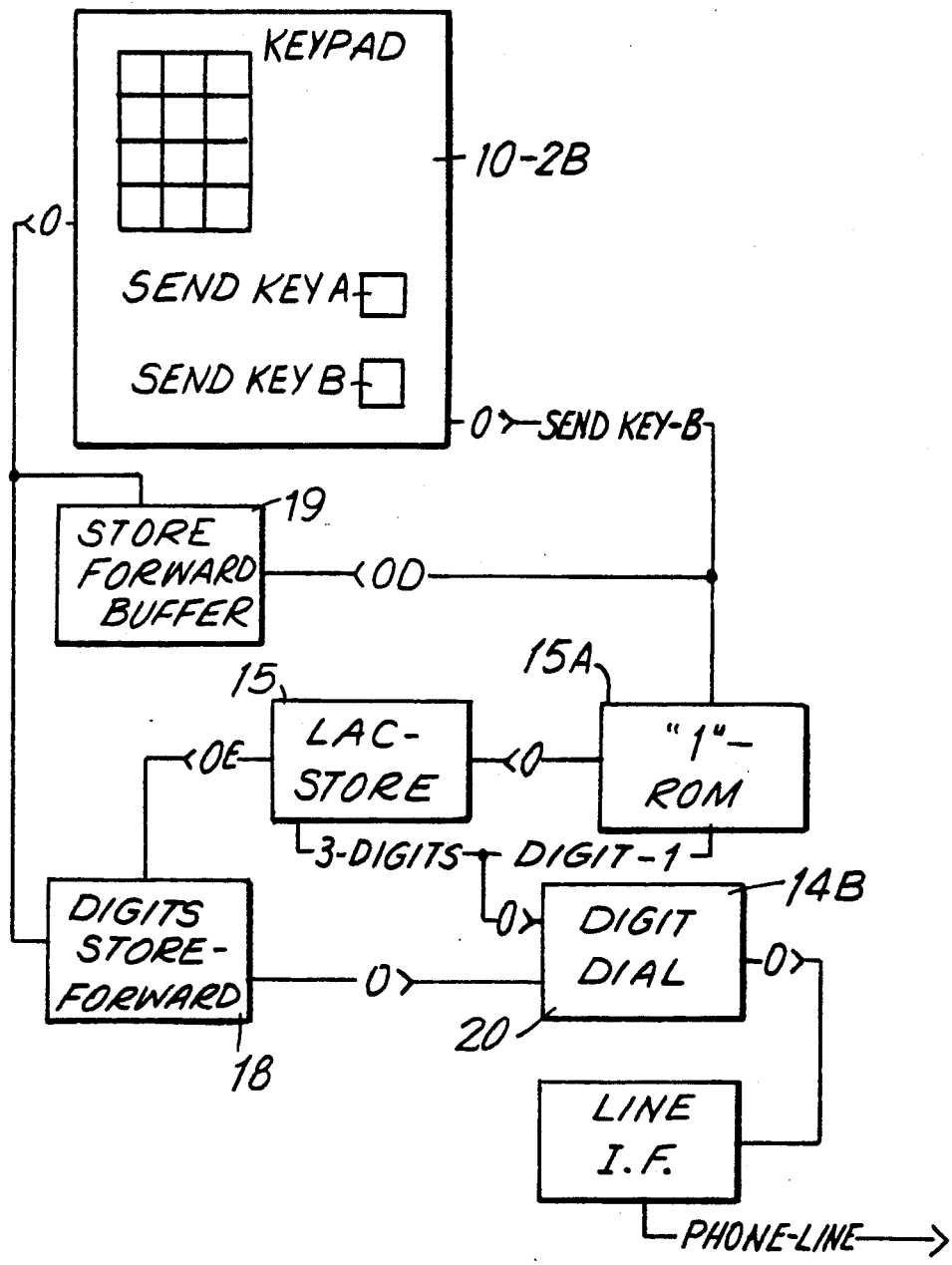
FIG. 2B is a block diagram of an alternate embodiment.

Referring now to FIG. 2B an alternate method, instead of the Dual Actuation of the Send key, is shown. This method provides two separate SEND KEYS—A and B. Actuation of Send key A would effect normal cellular digit dial out operation whereas, a single actuation of Send key B would effect the LAC digit dial out sequence.

In this configuration the operational sequence is the same as for FIG. 2A except that the Actuation Count modules 51, 52, and 53 are not needed.

As is apparent from the above operational description relative to cellular telephones, cellular telephone use does require the utilization of a digit Store & Forward technique because, at the outset of the dialing sequence, the system does not call for the user to activate any input key in a special, prescribed manner. Consequently, the system is not notified in advance, by the user, whether he desires to use the LAC or not, in placing his long distance (L.D.) call. This information is first determined by the system, in conjunction with the digit count modules at the time of actuation of the SEND key.

Figure 3:
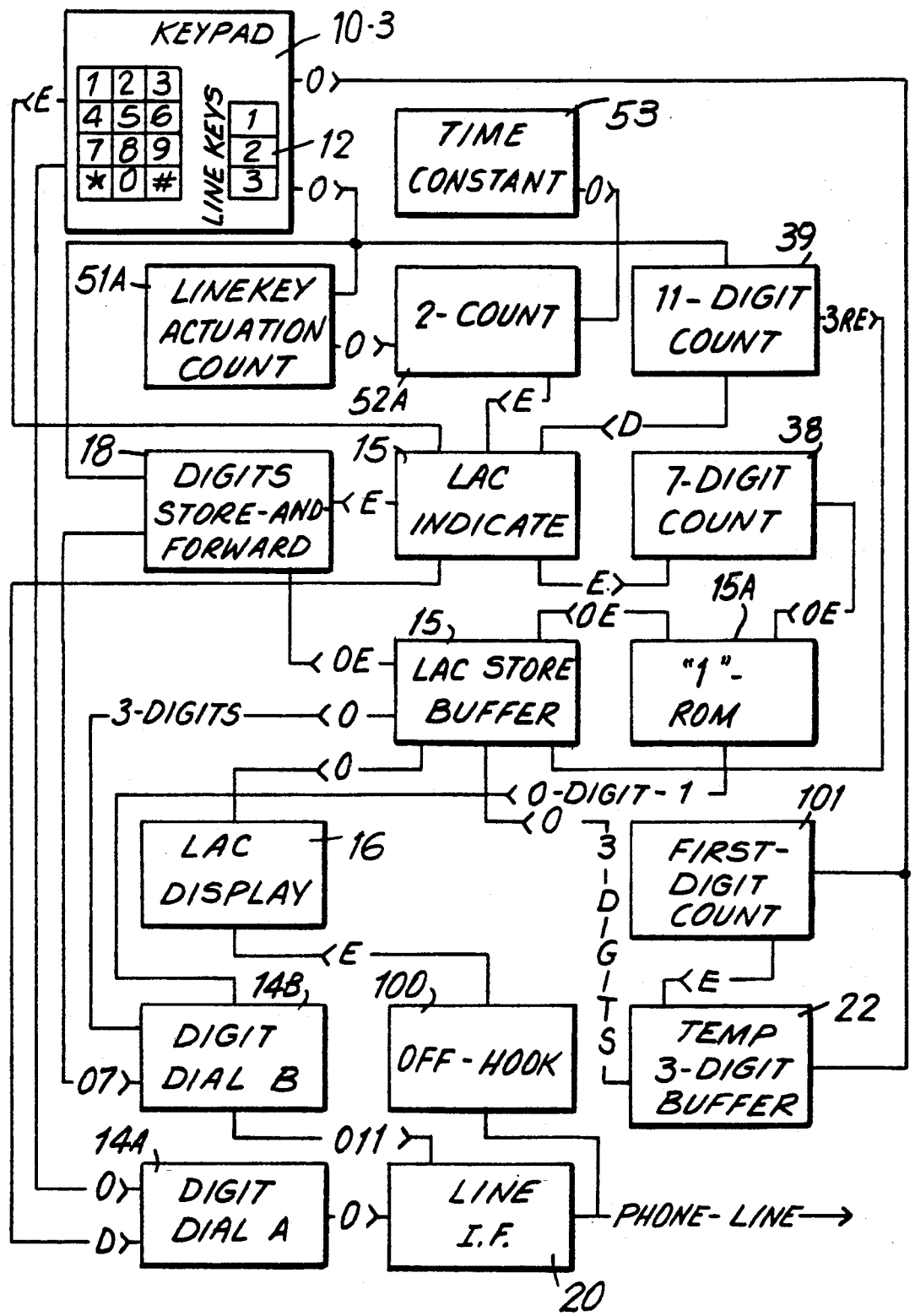
FIG. 3 is a block diagram showing a second alternate embodiment of this invention as it applies to key telephones.
Figure 3A:
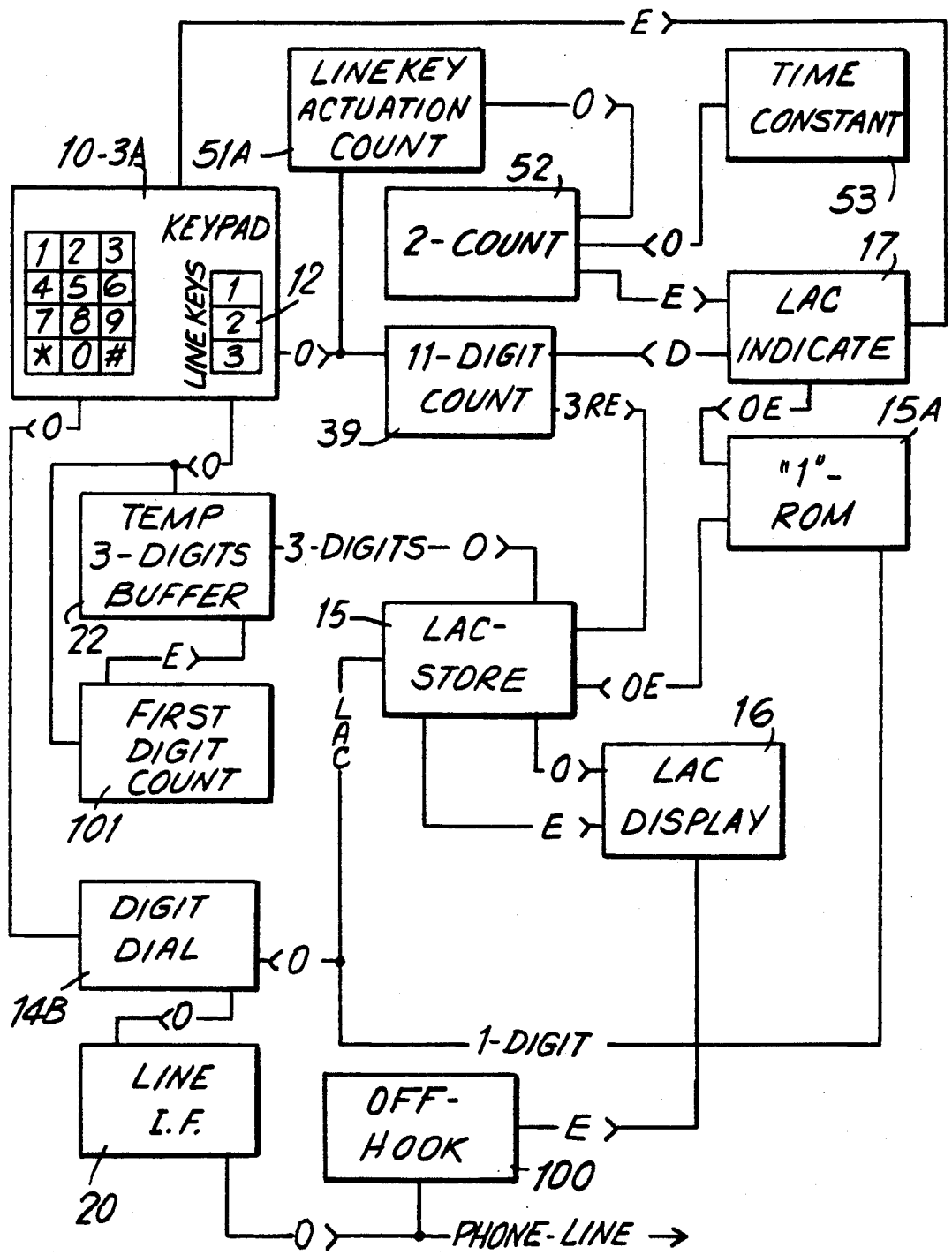
FIG. 3A is a block diagram showing a third alternate embodiment as it applies to key telephones.
Figures 1, 3A:
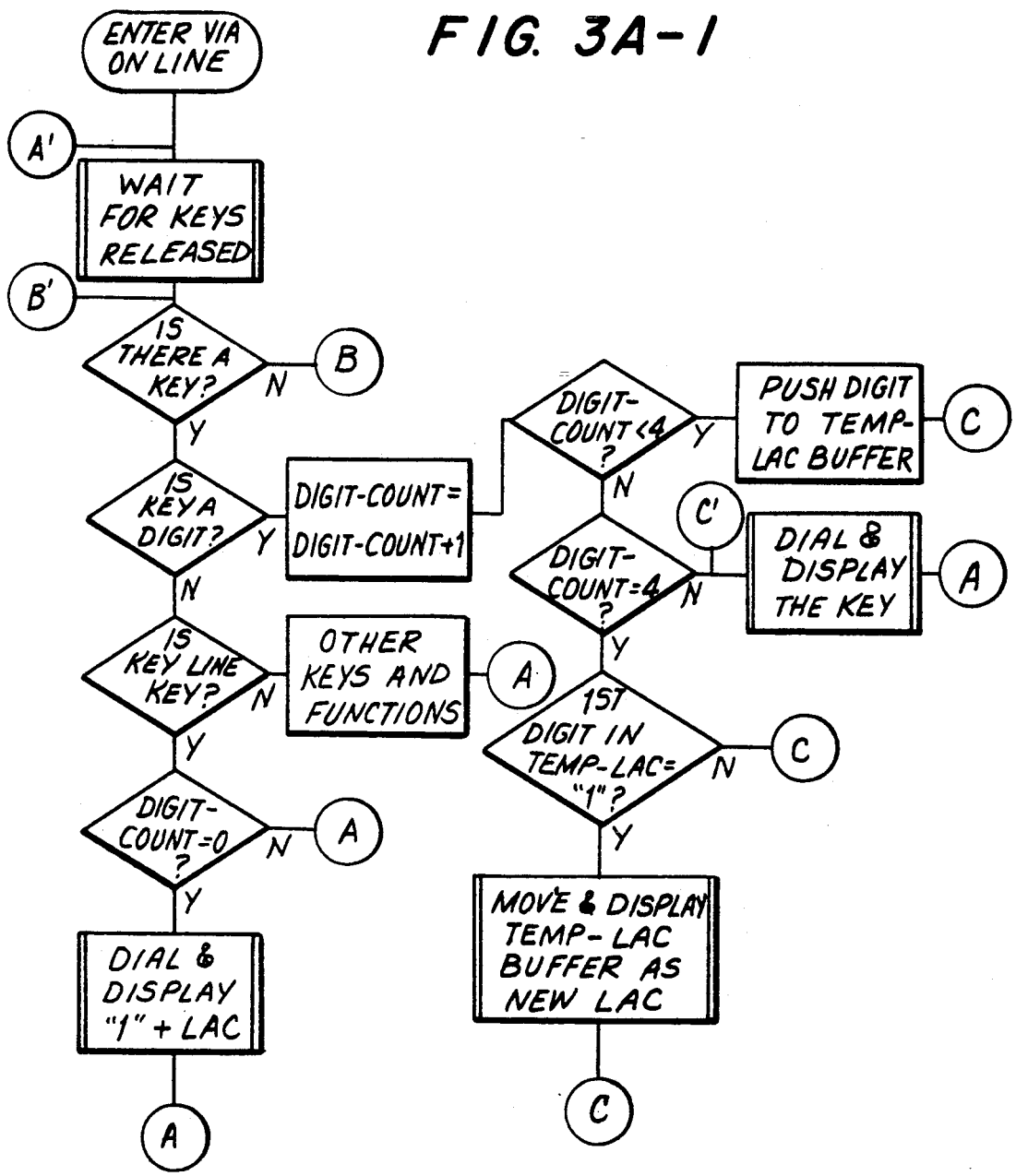

Since the store and forward technique is standard practice with cellular phones of all types, the described method does not represent a shortcoming of the Invention. However, with key phone type telephones this is not the case. We will now proceed to describe two alternate methods for key phone use, the first of which will use a store and forward technique. The second method to be described will not embody a store and forward (S&F) technique; these two methods are shown in FIGS. 3 and 3A respectively.

Figure 7:
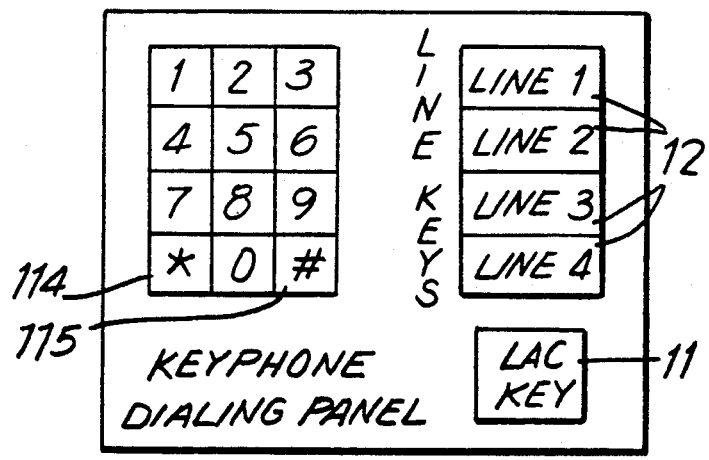
FIG. 7 is a diagrammatic illustration of a key phone dialing panel.

In the case of a telephone system of the key type a subscriber must access a line key 12 before placing the call. A diagrammatic representation of a key phone panel is shown in FIG. 7. The system could be implemented to detect two successive actuations of a line key to inform the system that a L.D. call is to be made. To detect multiple closures of a key is well known and within the state of the art and essentially multiple closures of a line key can now indicate that a long distance call is to be made. A dual actuation of a Line key is detected by module 51A in cooperation with modules 52 and 53 as already explained in connection with FIG. 2A.

For example, in order to initiate the dial out of a long distance call in an electronic key system wherein the LAC is to be used, a user would be instructed to implement the following sequence. First, the user upon initiation of a call, would cause activation of display 16 to display the stored LAC. The user would be instructed to actuate a prescribed key, e.g., a line key twice in succession, as a prescribed actuation. By doing this, the telephone Key Pad 10-3 would transmit the two pulses to the Line Key Count modules 51A and 52, which will indicate that a line key has been actuated twice in succession and hence a long distance call is to be placed.

The user then merely keys in seven digits. By dialing seven digits, the system automatically knows that the subscriber intends to utilize the stored area code because the line key was activated twice in succession. The Count digit module 38 begins to count the dialed digits due to the fact that subscriber indicated a long distance call. Module 18 stores the dialed digits and module 38 counts the same to assure that there are seven digits dialed whereby upon dialing of seven digits, the call is processed. When module 38 determines that 7 digits have been dialed and stored, module 38 automatically actuates module 15A which in turn actuates the stored area code module 15 which, respectively, cause a "1" plus the stored area code to be transmitted to the telephone line interface 20. When this is done, the stored digits in module 18 are then transmitted in succession over the telephone line interface 20 to complete the requirements for a full transmitted telephone number.

Thus, as one can see from the above, this abbreviated dialing procedure can be implemented by many different techniques by first indicating to the system that a long distance call is to be implemented. The indication of a long distance call can be implemented by means of a line key as for example depressing a line key 12 one or more times or by a separate key as LAC (FIG. 7) which can serve as a LAC use notification to the system. This will inform the system that the subscriber wishes to implement a long distance call using the LAC.

SPLIT LINE KEY

Figure 8B:
FIGS. 8A, 8B illustrate touch sensitive dual circuit line keys.
Figure 8A:
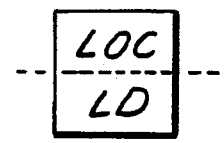

Another method can be implemented wherein a membrane touch sensitive split Line key can be provided comprised of two sections. The sections are marked LOC for Local and LD for Long Distance, respectively as shown in FIG. 8A. Or, alternatively, as shown in FIG. 8B, the two sections can be marked NOR for Normal and LAC for Last Area Code, respectively.

With this arrangement the user would not have to actuate the line key twice in succession but would simply indicate what type of call he is about to place by actuating the applicable respective Line key sections, only once, before keying in the requisite digits on the key pad.

It is now apparent from the above that in the case of a Key system wherein, in order to obtain dial tone, a Line key must be actuated before a dialing sequence can be initiated, two methods of implementing the invention are possible, as follows:

METHOD 1—WITH STORE AND FORWARD

A Dual actuation of the Line key informs the system that the user desires to place a Long Distance call (L.D.). If the user wants to use the Last Area Code (L.A.C.) (as displayed on display 16), he proceeds to dial only the 7 last digits of the phone number. He does not dial the L.D. access digit 1 and the three Area code digits.

Again, referring now to FIG. 3, the digit Store and Forward module 18 stores the digits as keyed-in by the user. Immediately, following the dual actuation of the Line Key, the LAC Indicate module 17 via module 52A will detect the dual actuation and will generate an appropriate output signal. The output signal in turn is directed to the 7 digit count module 38 which is now primed to count the digits entered and to subsequently actuate the "1" ROM 15A.

The "1" ROM module in turn, will effect actuation of the L.A.C. store module 15 output thus, effecting the dial out of the digit "1" plus the 3 digits of the stored LAC over digit Dial module 14B and the Line Interface 20 and then, subsequently, the actuation of module 18 now enabled by module 15, effects the dial out of the 7 stored digits over the phone line, via interface 20. The digit dial module 14A is disabled at this time by module 17. In this scheme of operation, module 38 and the Store and Forward module 18 are necessary components in the invention's embodiment.

METHOD 2—WITHOUT STORE AND FORWARD

In this method illustrated in FIG. 3A, we again employ the dual actuation of the Line key to inform the system that the user desires to use the L.A.C. Here again, the user need not key-in the "1" and the area code but only dials in the last 7 digits of the phone number. But, in this instance, the manually dialed digits are directed to the phone line, concurrently with the user's keying in of the digits via modules 14A and 20. Consequently, in accordance with the teaching of this method, the system does not need the digit store module 18 nor count module 38 of FIG. 3. However, the system will still require the use of the 11 digit Counter 39 in order to be able to differentiate between a placement of a local call (7 digits) and the placement of a New Area Code long distance call (11 digits) so that the system will know on which call, to store into the LAC Store module 15, the three digits keyed in following a "1" access digit entry.

If the user desires to place a L.D. call but wants to use a new area code, not stored in module 15, the user must NOT actuate the Line key two times successively but, rather, one time only. He then proceeds to place the L.D. call in a conventional manner i.e., first dials in the digit 1 followed by the 3 digits of the new area code, and then dials in the last 7 digits of the phone number for a total of 11. The dialed digits are directed to the phone line concurrently with the user's dialing of the digits via modules 14A and 20.

Basically, there are two approaches:
1. To Store the keyed-in digits and to Forward them on to the phone line at the conclusion of the keying-in sequence.
2. To output the digits on to the phone line immediately as they are keyed-in by the user.

Technique 1 does require a Digit Counting capability and a Store and Forward capability.

Technique 2 does NOT require the Store & Forward capability but, as mentioned earlier, does require a digit count capability. This is needed in order to distinguish between a local call and a New Area Code long distance call wherein the user does not implement the dual actuation of a Line Key.

KEY PHONE/LAC STORE FIGS. 3 AND 3A

In the case of both Methods 1 and 2, the operational sequence for storing of a newly entered Area Code is as follows:

Referring to FIGS. 3 and 3A, it will be seen that the 11 Digit Count Module 39 upon an 11 digit count, enables the 3 Digits Retrieve function of the LAC Store Module 15. Module 15 will now retrieve the 3 area code digits stored in the 3 digit module 22 for display and dial out on subsequent long distance calls. Module 22 digit store function is dependent on the First Digit Count module 101 so that the module 22 digit storing function is operative only after a 1st digit has already been dialed-in.

HOLD DOWN OF A KEY/DELAYED RELEASE

Figure 3B:
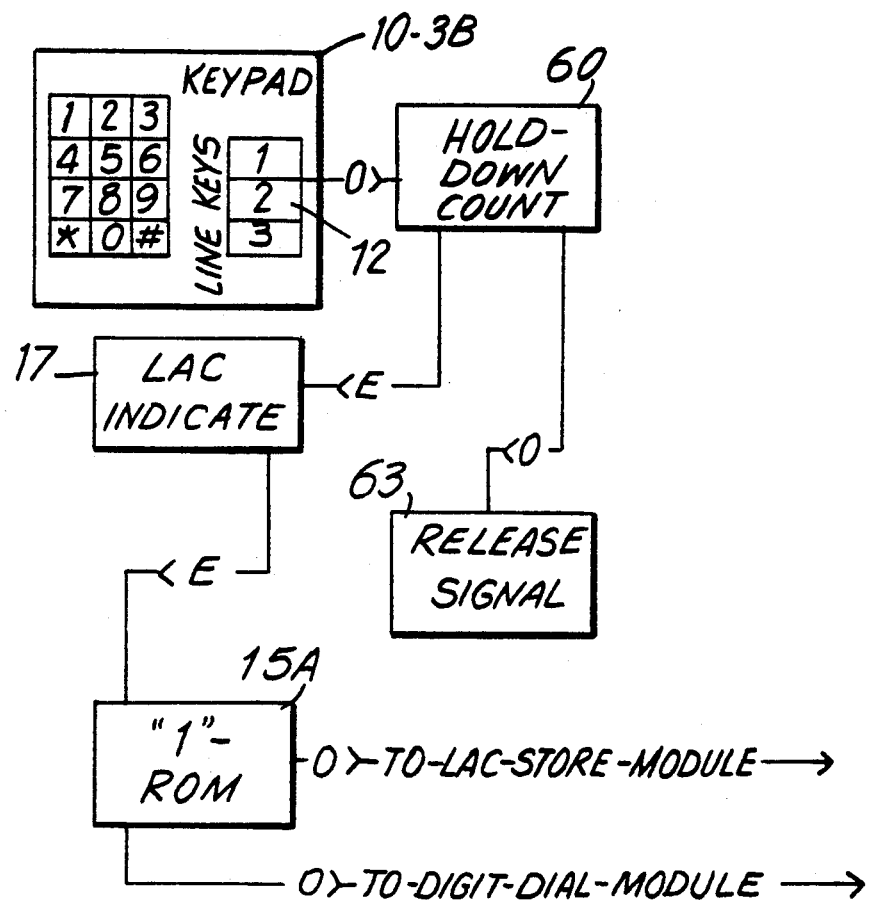
FIG. 3B shows a form of execution of the invention as it relates to key telephones.

Similarly, an alternative method of indicating to the system in advance that the last area code is desired can be implemented in the following manner:

If the user desires to employ the last area code, he depresses a Line Key and maintains it depressed until a Release Signal is sounded by a module similar to module 63 to be later on described in connection with FIG. 4. This delayed release of the Line key informs the system in advance that the user desires to use the last area code. This method is indicated in FIG. 3B.

The hold down of a key is detected by a HOLD DOWN COUNTER module 60. The Counter which is a binary counter will commence counting when a key is held down. If the counter reaches a predesignated count, the subscriber is notified of this and the system recognizes the hold down function. The hold down counter 60 may be replaced with a monostable multivibrator which produces a given time delay when a key is actuated. If the key remains depressed after this time period then the system recognizes that a hold down function is to be implemented.

A similar approach can be adapted for standard Non-Key phones as follows:

Upon the user's lifting of the handset off-hook, the display 16 will indicate the stored area code. If the user desires to employ this area code, he depresses the digit key corresponding to the 1st digit of the 7 digit phone number and maintains the key depressed until a Release signal is sounded. This delayed key release informs the system in advance that the user desires to use the stored area code. Again, the system performance will now be identical as already described above in connection with the dual actuation of the Line keys. The same approach would be valid also in the case of a Cellular phone. The user can notify the system in advance that he desires to use the displayed area code by the delayed Release of the 1st digit key entry. This approach is indicated for key phones in FIG. 3C in block diagram fashion, and in FIG. 10 for cellular phones, in flow chart fashion.

Alternatively, in the case of cellular phones, the Delayed Release method can be utilized to indicate that the user desires the system to fill-in the LAC, by the Delayed Release of the Send key actuation upon completion of the key-in of the 7 digits of the phone number.

In the case of a phone having a Speaker On key, a method similar to the Line key phones is implemented. In this case, if the user desires to use the displayed area code, he actuates the Speaker On key and maintains it depressed until a Release signal is sounded.

It should be borne in mind that in all instances wherein the dialed digits are directed to the phone line as they are entered, the Store & Forward module 18 is NOT needed for the execution of the dialing sequence.

As already indicated above, the user indicates that he wants to dial the Last Area Code by one of several methods. To reiterate, for purposes of illustration, in an electronic Key Telephone subset, the user can activate a Line Key twice in succession or maintain the Line Key depressed for a predetermined time interval, thus, indicating his desire to dial the Last Area Code (LAC). Similarly, on NON-Key type telephone subsets, a user can indicate that he wants to use the LAC, by maintaining the digit key of the first digit entry of the phone number—(exclusive of the Area Code) in a depressed mode, momentarily, until a Release Tone Signal is emitted by the system.

USE OF HOOK/FLASH

Another technique that may be advantageously adapted for standard phones would be to utilize a hook flash actuation in advance of keying in the digits. The hook flash would serve to notify the system in advance that the use of the LAC is desired. The operational sequence would be similar to the sequence detailed in regard to a Line key use in the case of key phones.

As soon as the user indicates his desire to use the Last Area Code, the system will instantly dial the Access digit "1" followed by the three digits of the previous Area Code.

The various techniques and methods indicated above all have the same objective in common, namely, to inform the system, in one way or another by some prescribed technique, that the user wants to employ the Last Area Code in his immediate dial-out sequence in the placement of a Long Distance call.

DEDICATED LAC KEY

Figure 3C:
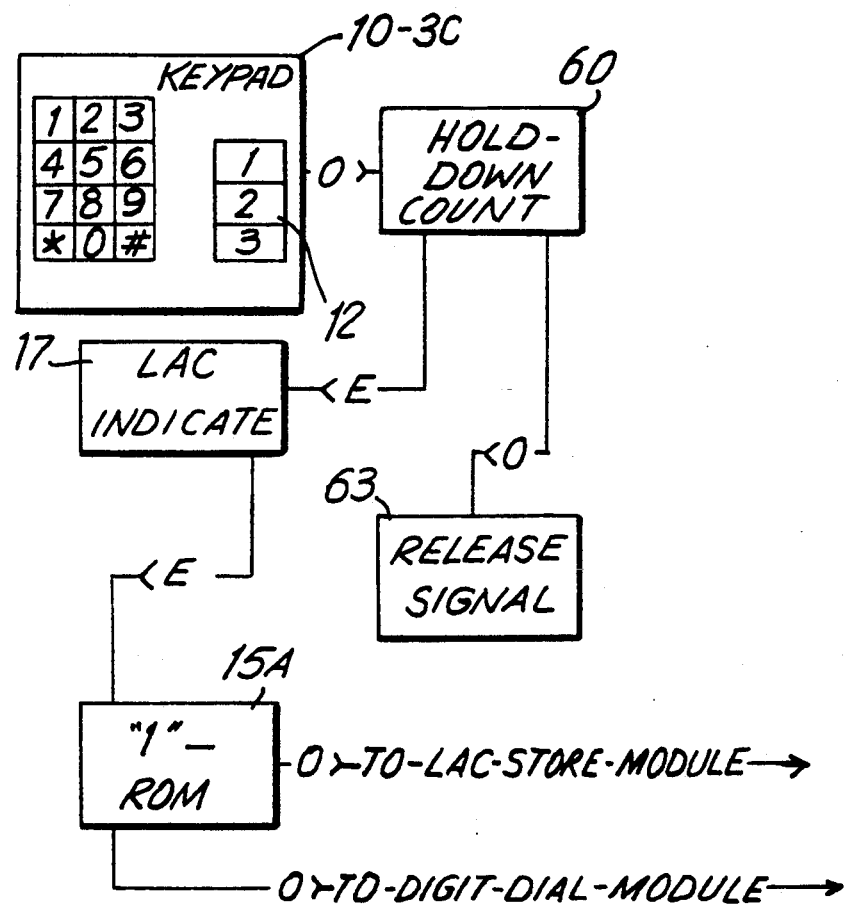
FIG. 3C also shows a form of execution of the invention but as it relates non-key type telephones.
Figure 3D:
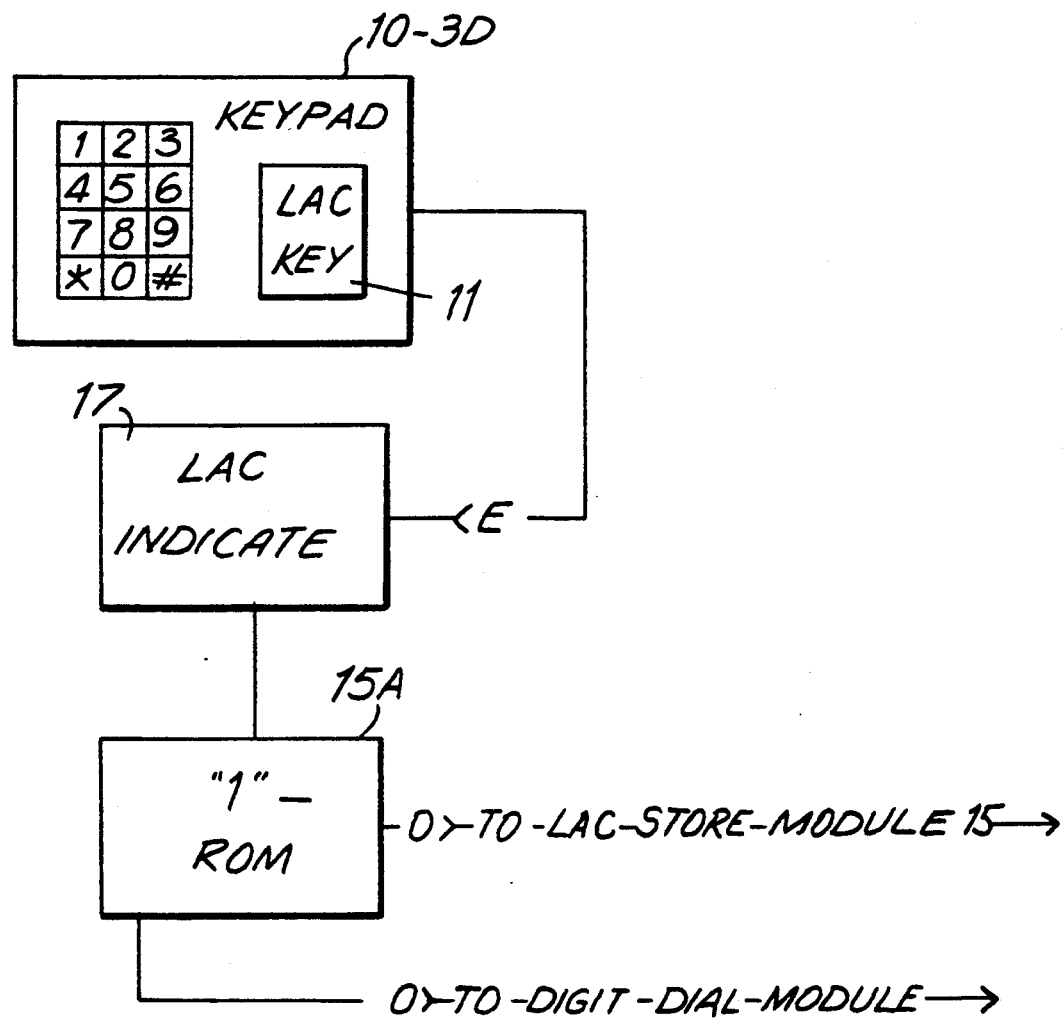
FIG. 3D illustrates still another method of execution of the invention.

As one will understand, the notification to the system of a long distance call wherein the Stored Area Code is to be used can be implemented in many ways. Thus, as already indicated, one can have a separate key whereby, when the subscriber actuates the key, it immediately informs the system that a long distance call is to be placed using the stored LAST Area Code. This key could be, for example, key 11 on the Key Pad 10-3D and designated as the LAST Area Code (LAC) key as shown in FIG. 3D. Responsive to the subscriber's initiation of a call upon removal of the telephone handset, the display 16 will display the Stored Last Area Code. When key 11 is actuated by the subscriber, the LAC Indicate Module 17 coupled thereto will acknowledge this fact, and hence will indicate that a long distance call is to be made using the Last Area Code. The output of module 17 is directed to the "1" ROM module 15A which causes it to thereby immediately pulse out a "1", and also to activate the Store Area Code module 15 to follow immediately with the pulse out of the area code digits both of which are directed to module 14B and to the telephone line interface 20. Module 20 outputs all of the digits to the phone line in a conventional fashion. In this manner, a subscriber merely has to dial 7 digits associated with the LAST Area Code in module 15 and does not have to dial the area code digits. In the case of a Cellular phone, the subscriber would be required to actuate the SEND key after dialing the 7 digits as was detailed earlier on in the specification.

Since actuation of key 11 serves to notify the system in advance that a long distance call is to be made, the subscriber does not have to key-in the long distance access digit "1" as the system will output the digit 1 automatically, responsive to the actuation of key 11. This is accomplished by module 15A as indicated above.

If, on the other hand, the user does not want to employ the stored area code, he does not actuate the LAC key but enters a "1" followed by the new area code he is calling and then dials the 7 digits of the phone number, thus placing a long distance call in a conventional manner. The new area code dialed will be stored in module 15.

STAR, POUND AND STORED PHONE NUMBERS ACCESS KEYS

It should be pointed out here that the star and/or pound keys 114 and 115 in FIG. 7 respectively, located on conventional dialing key pads as well as stored phone numbers access keys found on many conventional telephones (not shown), may be readily adapted to be utilized to function as the dedicated LAC key to perform the functions attributed to key 11.

SUMMARY OF ADVANCE LAC INDICATE METHODS—PRESCRIBED KEYS AND PRESCRIBED ACTUATIONS

A—Hold-Down/Delayed Key Release (a) FIRST DIGIT ENTRY-DELAYED RELEASE
(b) SPEAKER ON/KEY-DELAYED RELEASE
(c) LINE KEY-DELAYED RELEASE
(d) SEND KEY-DELAYED RELEASE

B—Dual Key Actuation (a) LINE KEY-TWO SUCCESSIVE ACTUATIONS
(b) SPEAKER ON/KEY-TWO SUCCESSIVE ACTUATIONS
(c) SEND KEY-TWO SUCCESSIVE ACTUATIONS

C—Single Key Actuation (a) DEDICATED-LAST AREA CODE KEY-LAC KEY

PBX—HOTEL ETC. LINE ACCESS DIGIT/S—L.D. PREFIX DIGIT/S

The concept of the invention is applicable, as well, to any set of first digits keyed in. For example, in the case of a PBX wherein an internal Long Distance (L.D.) line access prefix digit, such as "8", has to first be dialed followed by the L.D. access digit 1 and the area code (lead digits or first digit group or first digit category). The system store modules 22 and 15 can be designed to accommodate the storing of the first 5 digits instead of only 3 digits. Likewise, if the circumstances call for storing more than the first 5 digits, say for example the first 6 or even the first 7 digits, the store modules inputs can be made switchable to accommodate any number of first digit access prefixes.

Such modification of memory modules and IC chips are well known in the state of the art and is therefore not shown.

Mention should be made here that, similarly, it is within the scope of the invention, as well, to be adapted with some modification, for use with the lead digits, digit first digit sequence prefixes of Local exchanges. Such adaptation is very useful in cases when the dialing apparatus of the system is being used in a particular locality being served by a phone company Central Exchange having only one Exchange Prefix.

In this instance, the caller will have to manually key-in only 4 digits on each call, instead of 7 digits. The system will automatically dial out the first 3 Exchange Prefix digits (lead digits or first digit group or first digit category) upon appropriate prescribed key actuation by the user such as, for example, the delayed release of the first digit key entry of the 4 last digits of the phone number.

ONE TOUCH DIALING OF PROGRAMMED DIGITS BY A KEY HOLD-DOWN METHOD

The following description outlines a capability of the system which enables a user to access a programmed series of digits of a phone number or a portion of a phone number such as the access digit 1 and any given area code by a Key Hold-down method similar to the method already described in connection with FIGS. 2C and 3C.

In connection with area codes a very useful and valuable application of this method will be illustrated as it pertains to a most ubiquitous area code, i.e., the 1(800) area code. It should be understood, however, that the same approach can be used to great advantage, as well, for accessing and dial out of complete phone numbers.

AUTOMATIC 800 ACCESS

Figure 4:
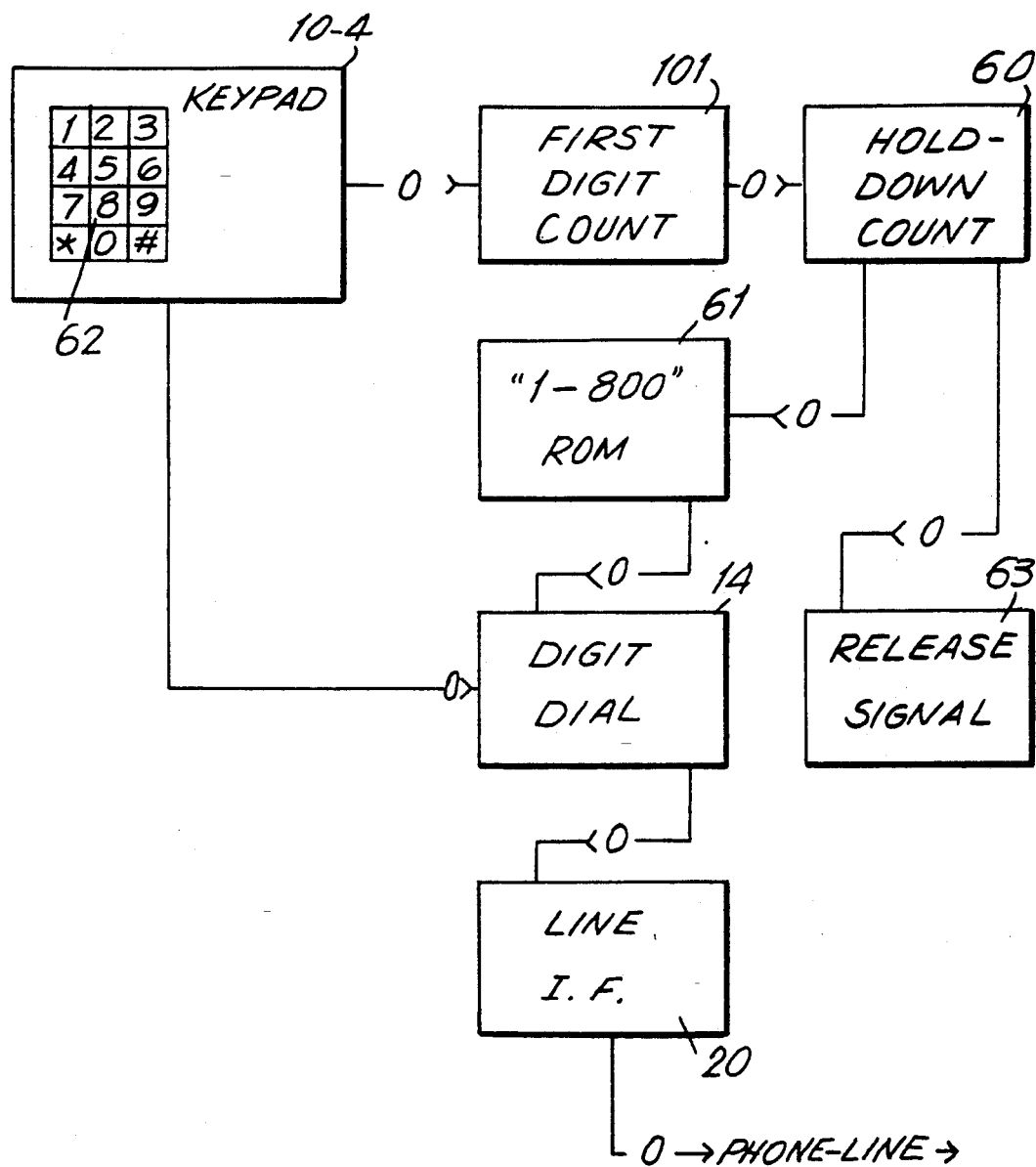
FIG. 4 is another block diagram showing a system for selecting popular area codes such as the 800 area code.

Referring to FIG. 4, there is shown still another feature of the present invention which will now be explained. It is known that certain area codes are extremely popular. As for example, 1-800 area code which is a toll free call. The 1(800) digits can be programmed into a ROM or RAM module 61 which is accessed, for example, by the first digit key-in of the "8" digit key 62, on the key pad 10-Y. In this manner, the subscriber via the key pad 10 may hold down the digit key "8" for a given period. The first digit key-in and the hold down of the key is detected by the first digit count module 101 and by means of a hold down counter 60. The counter which is a binary counter will commence counting when a key is held down. If the counter reaches a predesignated count, the subscriber is notified of this. The hold down counter 60 may be replaced with a monostable multivibrator which produces a given time delay when the associated key is actuated. If the key remains depressed after this time period, then the system recognizes that a hold down function is to be implemented. The system then accesses the memory storage ROM 61 whereby the system causes the 1-800 area code to be automatically dialed out on the telephone line via Digit Dial module 14 and module 20. Thus, popular area codes such as the 1-800 area code or other area codes which are widely used can be stored in separate memory ROM or RAM locations and accessed by the subscriber holding down a given key for a predetermined period. When the period has transpired, the system will actuate an audible acknowledge Release signal such as a beep or other alarm indicating that the hold down period is sufficient. The Release signal may be generated by any number of suitable audio signal generating circuits or modules, well known in the state of the art. A signal generating module is represented in FIG. 4 by module 63. The system after recognizing the hold down period will now implement the dialing of the stored area code as a 1-800 area code or another popular area code.

Accordingly, a keypad may have a separate key or utilize any digit key together with a hold down feature to initiate an automatic dial out of any given programmed digits. For example, in the case of 1-800, the subscriber would hold down the "8" key. In the case of the area code 1-(213), the subscriber will hold down the "2" key or, alternatively, the long distance access digit "1" may be utilized in this fashion or, any given first digit in the digit key-in sequence of the local phone number segment of the long distance number being called.

It should be noted here, that the preceding approach for implementation of the described feature, is operative on key pads that generate the dialing pulse or tone on the release of any given digit key following its depression as opposed to key pads that generate the dialing signals (pulse or tone) on depression of any given digit key.

An alternate approach for directing the system to dial the (800) digits is described herewith in connection with cellular phones. The operational sequence follows:

The user in desiring the dial-out 1-800 digits, first enters the digit "1" and then keys-in the 7 digits of the phone number. He then actuates the Send Key two times in succession. Since his first key entry was the access digit 1, yet he actuated the Send Key twice in succession, the system logic is programmed to outpulse a "1" followed by the 800 digits.

Figures 1, 4A:
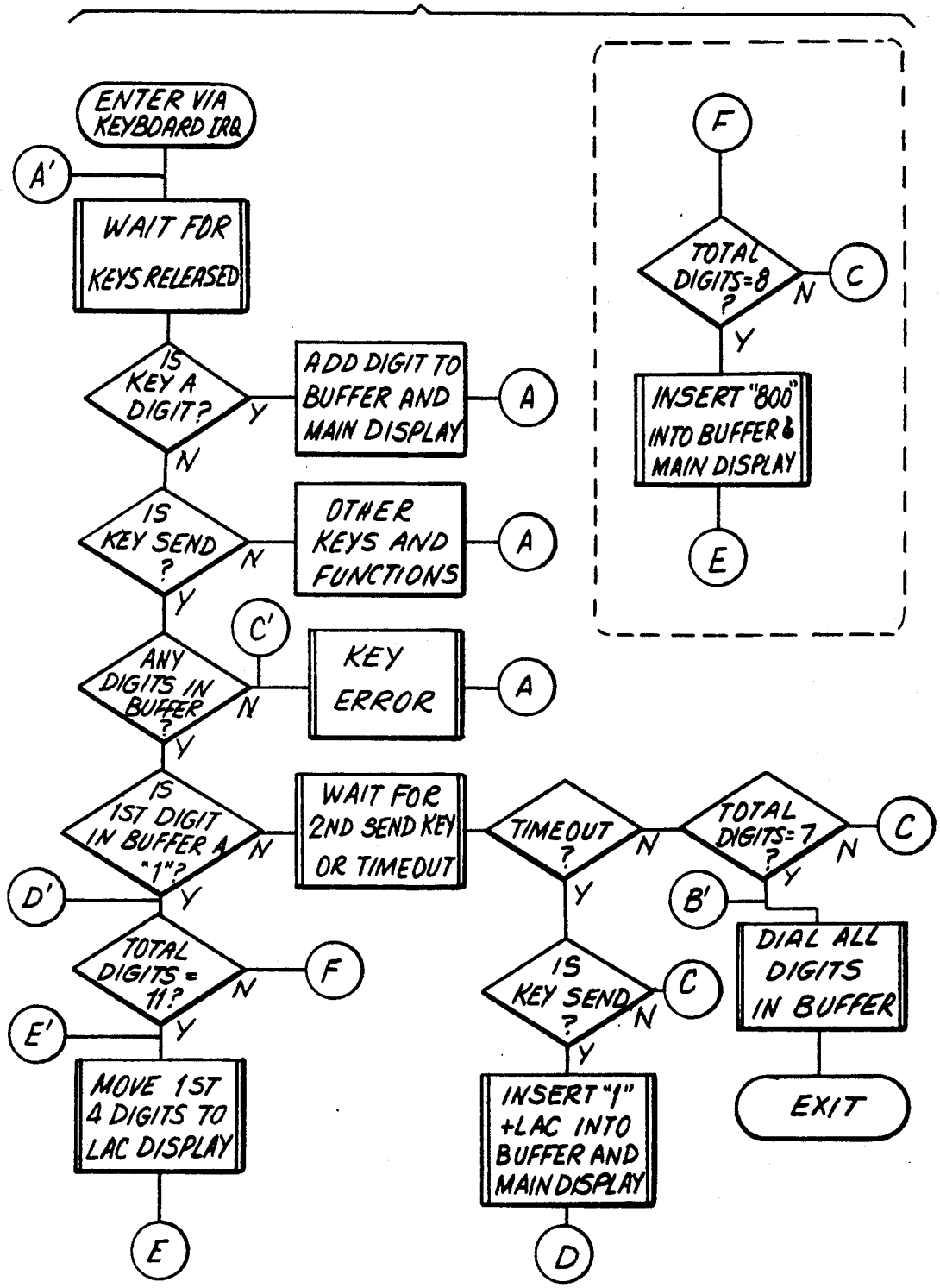

The Logic Sequence of this feature can be followed in the flow chart shown in FIG. 4A-1.

This feature is operational, as well, in the case of Key phones as well as in the case of standard phones, in all instances wherein the use of the LAC is indicated by the user, by any one of the methods outlined above, wherein the access digit "1" is not entered as the 1st digit entry upon placing a Long Distance call, e.g., Hold Down of the 1st digit key entry, Hold Down of a Line Key, Dual Actuation of a Line Key, Hook Flash actuation, etc.

As one can ascertain from the above, it is a main object of the present invention and the apparatus to eliminate the necessity for the subscriber to repeat dial area codes when the last area code or the stored area code is the desired code.

In addition, the invention teaches methods and apparatus by the use of which the user avoids the need to dial access codes such as the 800 access code or PBX Prefix access digits that may be called for.

In this manner, the system enables the subscriber to substantially reduce the number of digits that are to be dialed. This is particularly advantageous in the case of the cellular subscriber. There are many ways of implementing the above-described system operations.

ABBREVIATED VOICE RESPONSIVE DIALING FOR CELLULAR AND OTHER PHONES

In connection with the enhancement of safety of cellular phones related to dialing out in the midst of driving, it would be appropriate to mention a system available in this connection. This system is Voice Recognition dialing adapted to Cellular phones.

With respect to the instant invention it would further augment the benefit of Voice Recognition dialing systems if the user would not have to repeat dial the same Area Codes on every successive call. Here, again, the Last Area Code (LAC) dialed would be stored in a Memory module. The user would only have to annunciate a command word such as "LAC", "START" or "ENTER" and the system would retrieve the LAC from memory and proceed to dial a "1" and the area code digits comprising the LAC. The user would then have to enter vocally only the last 7 digits of the phone number.

The described procedure would be of great value as well, also in cases of non-cellular conventional phones, such as in the case of key phones. It would also be applicable, as well, for Fax machines.

Preferably, the above-described apparatus is implemented by means of a microprocessor including programmed software whereby all the features of the above-described system can be implemented. Hence, the flow charts to follow give one a clearer understanding of the microprocessor operation and the desired performance of the same.

Figure 9:
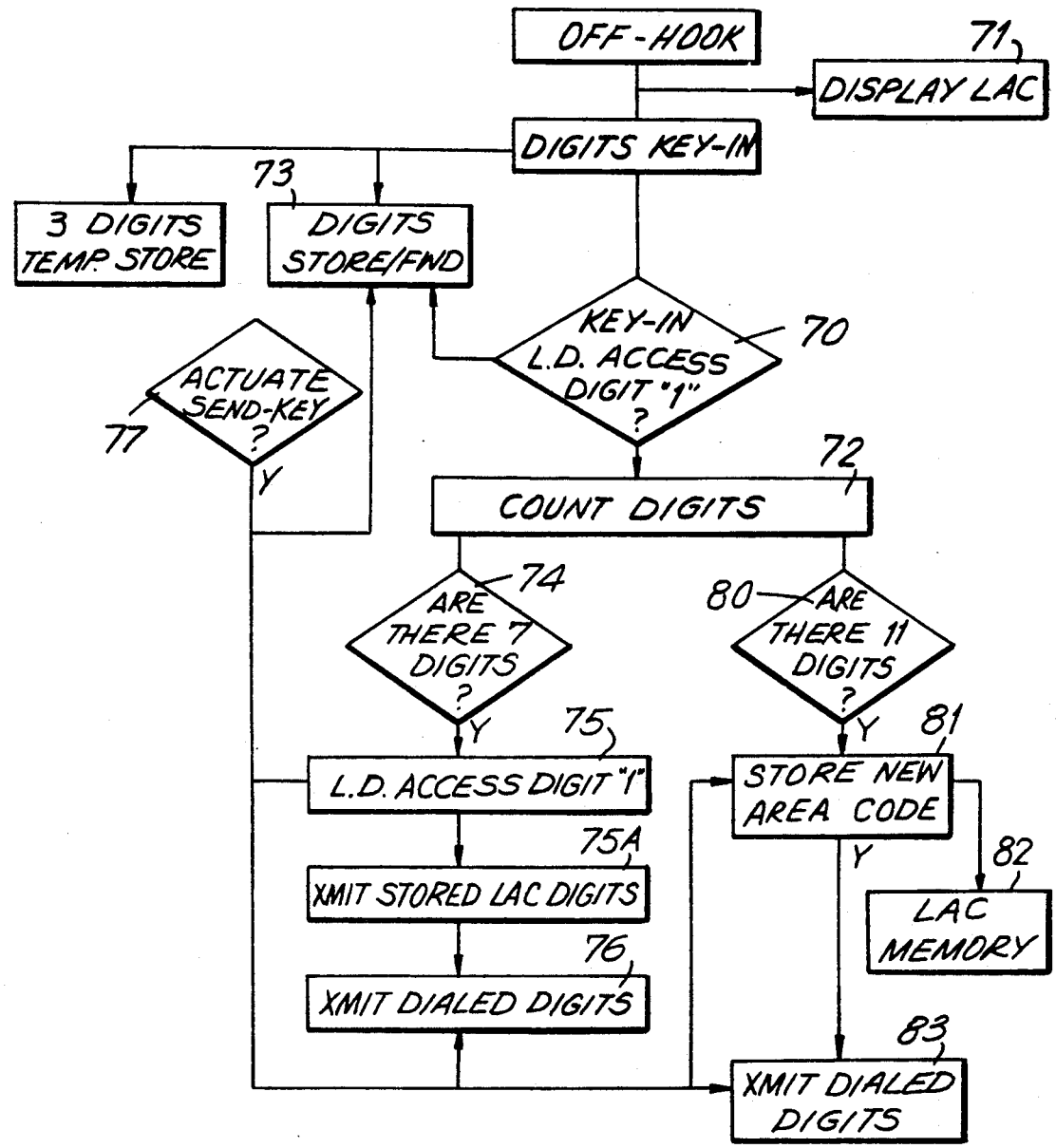
FIG. 9 is flow chart depicting the operation of an automatic area code dialing apparatus according to this invention.

The Flow Charts of FIGS. 9 and 10 relate to Cellular phones/FAX machines and are general in nature. FIG. 9 pertains to the Key-in procedure which calls for the user to first enter the Long Distance Access digit 1, also on L.D. calls wherein the LAC is used as illustrated in FIG. 2. FIG. 10 pertains to the Hold-down of the 1st digit key entry procedure relative to cellular phone use.

As shown in FIG. 9, the module 70 states "key-in L.D." access digit "1". As indicated above, the determination of a long distance call can be detected many ways. One way is by detecting that the subscriber dialed the digit "1" as a first digit. This will be recognized in the cellular system as the start of a long distance call.

Upon initiation of a call, the LAST area code stored is displayed as in module 71. After displaying the last area code, the system proceeds to count the digits dialed via module 72 and to store the dialed digits via module 73. In any event, if the system detects that only 7 digits have been dialed via module 74 after the SEND key 77 is activated, then the system knows that the subscriber desired to utilize the last area code stored. The system will cause the access digit 1 and the last area code stored to be transmitted as indicated by modules 75 and 75A and then transmit the actual dialed digits as stored which would be 7 digits as indicated by module 76. The system thus transmits a completed full digit telephone number even though the subscriber has actually dialed in only 7 digits. The full phone number transmission takes place after the SEND key is activated as in module 77.

The 3 digits after the 1st digit key-in are entered in the 3 Digits Buffer 81. If the subscriber dials in 11 digits as indicated by module 80, then the system immediately proceeds to store the new area code as indicated by module 82. After storing the new area code, the system transmits all the dialed digits as indicated in module 83 upon depression of the SEND key. Thus, as one can see from the above-noted flow chart, there are many ways of implementing the above-described operation. A second Flow Chart depicting the hold down of the 1st key entry method is shown in FIG. 10 as it pertains to FIGS. 2A and 2C.

The Flow Chart of FIG. 2A-1 relates to cellular phones/Fax machines and substantially illustrates the Logical Implementation of the invention as pertains to FIG. 2A.

The Flow Chart of FIG. 3A-I relates to Key Phones/Standard Phones and substantially illustrates the Logical Implementation of the invention as pertains to FIG. 3-A.

A brief synopsis indicating the Logic Sequence of the two Flow Charts 2A-1 and 3A-1 follows:

EXAMPLES OF LOGICAL IMPLEMENTATION OF LAC-ENHANCED DIALING FOR CELLULAR, FAX, ETC. FIG. 2A-1

Devices such as cellular phones and FAX machines typically use a store-and-forward algorithm involving the use of a dedicated "send" key to begin transmission of an already-entered number. As shown in the FIG. 2A-1 flow chart, such devices can use software or hardware to implement LAC-enhanced dialing by analysis of the leading-digit, the count of digits in the send-buffer, and a second press of the "send" key. If the leading digit is a "1" and the digit-count meets the criteria for a valid long-distance number, the "1" and the next three digits dialed are stored as the new LAC. If the digit-count is 7 (local), a second press of the "send" key indicates that the existing LAC should be inserted ahead of the dialed number before it is sent.

FOR STANDARD AND KEY PHONES - FIG. 3A-1

On direct-dialing devices (those which dial digits as they are entered), LAC implementation requires a pair of 4 (or 3, if the leading "1" is not stored) digit buffers current LAC and the second to analyze for an incoming LAC. Since most phone-devices today already have memories or multiple hardware buffers on-board for purposes of re-dialing and display, the data necessary for implementation already exists in many cases. As shown in the FIG. 3A-1 flow chart, LAC dialing can be implemented simply by monitoring for a tap of the "line" key (in a Key-phone) or a hook-flash (on a standard phone) before any digits have been dialed. A check for the leading "1" indicating long-distance access upon dialing of the fourth digit will provide error-free entry of a new LAC to override the old.

As already indicated, one can also employ another technique which would include a separate or dedicated LAST area code key. Upon activation of this key, the system will first dial out the 1 and the stored area code digits and then it will dial the 7 digits of the phone number. To dial a new area code, the subscriber actuates the 1 key and keys in the new area code plus the 7 digit phone number in a conventional manner. The store last area code module automatically stores the new area code keyed-in.

FOLLOWING LAC IMPLEMENTATION SYSTEM FILLS IN LAC ON ALL 7 DIGIT DIAL-OUTS

The following outlines several approaches wherein, once the user effects the LAC operation of the system, the system will continue to fill in the LAC on all 7 digit dial-outs by the user when placing subsequent long distance calls. These approaches serve to eliminate the need for the user to repeat the prescribed LAC key actuation on each long distance call he places wherein the stored LAC is used. Means are also provided enabling the user to restore the system to normal dialing operation. Each alternative approach will be set forth in sufficient detail to be understood but will not be accompanied by an illustrative diagram or drawing figure.

In all of the cases a Prescribed KEYING ACTUATION must be executed by the user. The methods differ in which key/s is actuated and/or in the form the prescribed key actuation takes.

DEDICATED "NORMAL" KEY

Once the LAC Operation is effected, the system will repeat dial the LAC on all 7 digits dial out calls unless the user first actuates a "Normal" key provided, then the system resumes dialing the keyed-in digits without filling in the LAC. If the user wants to resume the LAC operation, he must once more initiate the call with the prescribed key actuation, e.g. Dual actuation of Line Key or Delayed Release of 1st digit entry or in the case of cellular phones, dual actuation of SEND KEY at the conclusion of the keying-in sequence.

This approach of using a Dedicated "Normal" key is applicable as well to the DELAYED RELEASE ACTUATION of the SEND Key or of a LINE Key.

TWO (2) DEDICATED LAC KEYS—LAC KEYS A & B

1. To effect Normal LAC operation: User actuates LAC KEY A once
2. To effect Continuous LAC operation: User actuates LAC KEY B once System fills in LAC for ALL subsequent 7 digit callouts. Now, the user does NOT have to actuate the LAC KEY A on every LAC long distance call he places.

TOGGLING SWITCHING ACTION (TSA) OF DUAL ACTUATION OF SEND KEY OR LINE KEY

Once a DUAL ACTUATION of the SEND KEY or of a Line Key is effected then as long as the user wants to call long distance numbers using the LAC, he may now continue to place these calls with only a SINGLE actuation of the SEND key or a LINE key and keying-in of only 7 digits. When he resumes to place a Local call, he must again initiate the call by actuating the Line key twice in succession or actuate the Send key twice in succession at the completion of the key-in sequence. All subsequent calls, local as well as long distance, will now again be treated in the normal manner until the user again effects a call out with a Dual Actuation of the SEND key or a Line key, in which case, the system will toggle back to filling in all 7 digit calls with the LAC. If the user keys-in an 11 digit call, the system will then replace the stored LAC with the new area code as the new stored LAC.

This approach can be summarized by stating that a Dual Actuation of a LINE Key acts as a toggling function control—it goes from normal call processing to L.D. using the LAC and, then upon a subsequent Dual Actuation, it toggles from L.D. using the LAC, back to the normal call processing routine. So that once the system routine of using the LAC is effected by the user, he can now operate the Keys of the particular telephone instrument in its normal fashion in order to place calls, except that he need enter only 7 digits for all phone calls using the Area Code as stored in Memory 15. He does NOT now have to continue to redial this Area Code on every call he places to this particular area code locality.

The toggling switching actuation of the LINE Key is as well applicable to the DELAYED RELEASE ACTUATION of the SEND Key or of a LINE Key.

It is well known to accomplish the various results of the invention by utilizing conventional memories and telephone digit keys as well as other input keys. It is also understood that this invention addresses and is directed to all forms of telephone dialing means and equipment as well as key pads incorporated in varying forms in a multitude of telephone associated equipment. The following specifics are not intended to be limiting but only to serve to cite specific examples of various telephone associated equipment which are presently in wide use and incorporate phone number dialing means. Such equipment includes various telephone dialers, various telephone instruments and subsets including cordless portable telephones, cellular and mobile telephones, fax machines, dialing keypads, public pay phones and so on just to cite a few examples.

STAND ALONE DIALING KEY PADS

It should be mentioned that all of the various configurations, embodiments and methods of the invention described are, as well, contemplated to be used in and incorporated as part of stand alone Dialing Key Pads of all types for use with and to be incorporated into various telephone gear whether it be Cellular phones, Mobile phones, Key phones, Fax equipment, etc. just to cite a few examples.

It is, of course, strictly understood that the claims which are appended hereto will cover the intent and scope of the present invention, but it is clearly indicated that all of the claims apply as well to facsimile machines which, of course, are connected to telephone lines and which have means for dialing telephone numbers. Hence, the automatic area code dialing apparatus as above described is applicable to facsimile machines which are also in wide spread use and which would also receive great advantages from the use of the present invention.

As one will again ascertain, the system operates to reduce dialing by enabling a subscriber to eliminate the necessity of dialing an area code when the last dialed area code as stored is employed by the subscriber.

Figure 11:
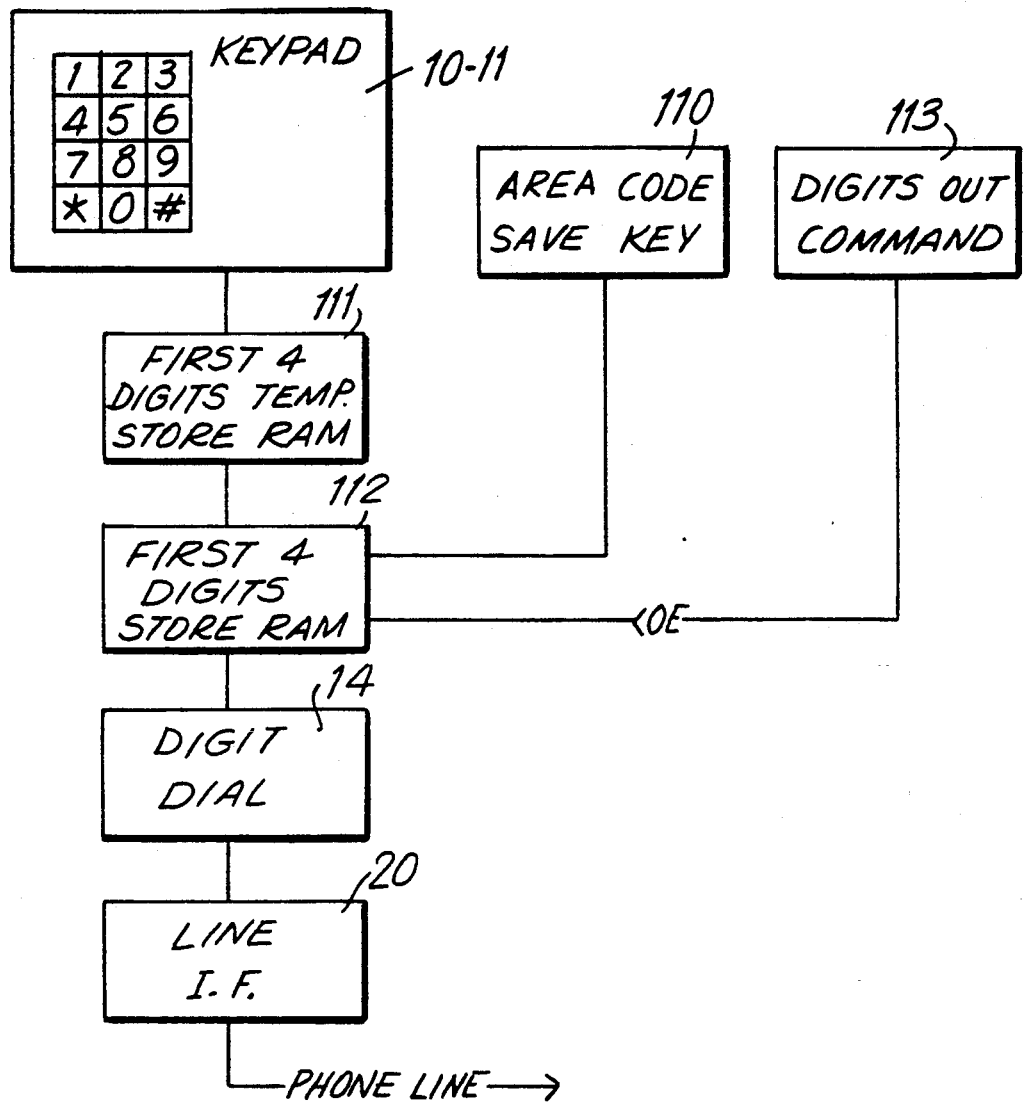
FIG. 11 is a block diagram illustrating a Save Area Code feature of the invention.

Referring to FIG. 11, a dedicated Area Code Save key (ACS) 110 is actuated after having dialed a telephone number including the local area code, to store the area code used in the preceding call in a SAVE Memory Module 112 for further accessing as needed. Accordingly, the user can now call various telephone numbers comprised of other area codes without removing the local area code from the SAVE Memory Storage 112. This feature permits the user to place calls in the local area, by actuating the ACS key and then keying-in the digits of the local telephone number he is calling without having to repeatedly key-in, on each and every call, the local area code.

On every long distance (L.D.) call, the Temporary Store RAM 111 stores the L.D. access digit "1" and the three area code digits. Now, when the user of a cellular system first dials a local number in a roaming locality, he keys-in the access digit "1" and the local area code followed by the seven digits of the local telephone number. This causes the four digits SAVE RAM 112 to retrieve the four digits stored in the temporary RAM 111 and to store them in its memory for future output on to the telephone line.

As already indicated, the user may now place numerous L.D. calls, using various other area codes, without obliterating the local area code stored in the RAM module 112. Any time subsequently, if the user wishes to place a local call in the roaming locality, he first actuates the Digits Out Command key 113. This enables the RAM 112 output causing it to output the access digit "1" and then the three local area code digits on to the telephone line, via the Digit Dial Module 14 and the Line I.D. module 20. Thus, the user now keys-in only the seven digits of the local telephone number.

To enter a new area code into the SAVE Memory module, the user actuates the ACS key 110. Module 112 now retrieves the most current four digits stored in the RAM 111. This action replaces the stored area code with the most rent one keyed-in during placement of the most current long distance call. As can be readily appreciated, this feature is especially advantageous for cellular calling, in a roaming locality, in order to avoid the need to repeatedly key-in the local area code for every local telephone number called within the roaming locality.

With respect to the LAC Memory Area Code Fill in function, this phase of the system continues to function in its normal fashion without being affected or disturbed in any way by the ACS feature.

Figure 11A:
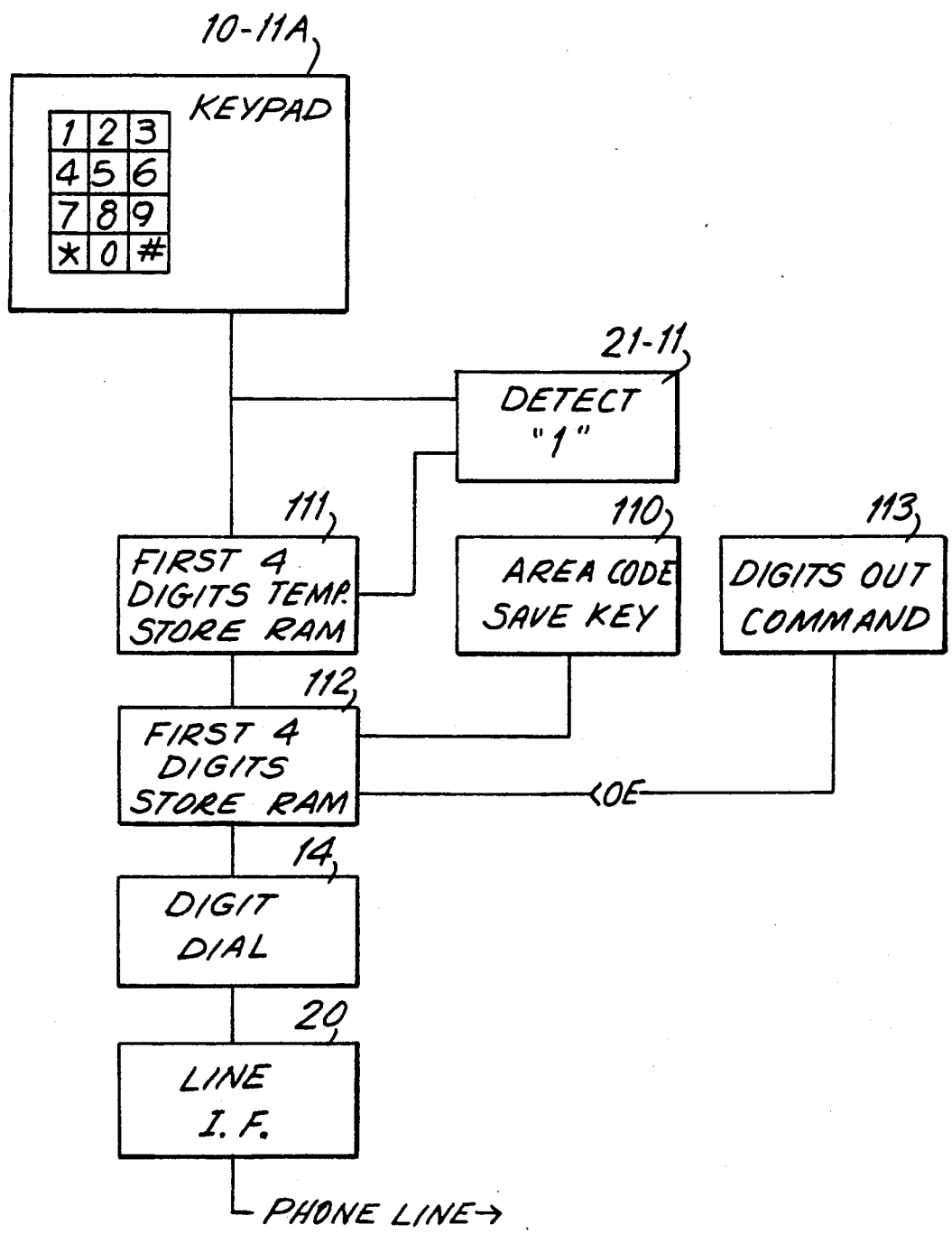
FIG. 11A is a slightly modified version of FIG. 11.

FIG. 11A is analogous to FIG. 11 and also comprises a Detect "1" module 21-11 for detecting the key-in entry of the access digit "1" and, in turn, enables the output of module 111 so that the store function of the SAVE RAM 112 will be operative only upon detection of the digit "1" on the first key entry. The Detect "1" module 21-11 operates in a similar fashion as the Detect "1" module 21 described in connection with FIG. 2.

I claim:

1. A method of user-transparently storing user-selectively retrieving, and automatically dialing area coders of long distance telephone numbers, in apparatus operatively associated with a communications system, said apparatus having a prescribed key, comprising the steps of:
   (a) initiating a first telephone call, including entering digits indicative of a long distance telephone number having an area code;
   (b) automatically storing the entered area code in sole response to step (a) in a manner transparent to the user;
   (c) initiating a second or subsequent telephone call, including entering digits indicative of a subsequent telephone number;
   (d) user-selectively retrieving the stored area code upon a prescribed actuation of said prescribed key; and
   (e) automatically dialing the retrieved area code in correct sequence with respect to the entered digits of the subsequent telephone number to complete a long distance call.

2. The method according to claim 1, wherein the entering steps (a) and (c) are performed manually by manual actuation of keys representative of the digits on a keypad.

3. The method according to claim 1, wherein said apparatus is voice-recognition capable, and wherein said prescribed key is a vocalization, and wherein said prescribed actuation comprises a particular word or words.

4. The method according to claim 1, wherein the automatic storing in step (b) is performed in response to the presence of a long distance access digit during the entering step (a).

5. The method according to claim 4, wherein the automatic storing in step (b) is performed in response to a certain number of subsequent digits having been entered after said long distance access digit.

6. The method according to claim 5, wherein said certain number is three or ten.

7. The method according to claim 1, wherein the automatic storing in step (b) is performed in response to the presence of a particular sequence of leading digits.

8. The method according to claim 1, wherein the automatic storing in step (b) is performed in response to a certain number of digits having been entered.

9. The method according to claim 8, wherein said certain number is ten or eleven.

10. The method according to claim 1, wherein said prescribed key is a send key.

11. The method according to claim 1, wherein said prescribed key is a line key.

12. The method according to claim 1, wherein said prescribed key is a second or alternate send key.

13. The method according to claim 1, wherein said prescribed key is a dedicated key.

14. The method according to claim 1, wherein said prescribed actuation is or includes a second or subsequent press of said prescribed key.

15. The method according to claim 1, wherein said prescribed actuation is or includes a hold-down of said prescribed key.

16. The method according to claim 1, wherein said prescribed actuation is or includes actuation of said prescribed key when the number of digits entered in step (c) comprises less than a certain number.

17. The method according to claim 16, wherein said certain number is eight or nine.

18. An arrangement for use-transparently storing, user-selectively retrieving, and automatically dialing area codes of long distance telephone numbers in a communications system, comprising:
   (a) entry means for entering digits;
   (b) first determining means responsive to said entry means for recognizing long distance telephone numbers having an area code;
   (c) storage means responsive to said first determining means for automatically storing the area code in a manner transparent to the user;
   (d) second determining means responsive to said entry means for discriminating when digit input to said entry means is inconsistent with a complete local or long-distance number;
   (e) a prescribed key;
   (f) means responsive to said first and/or second determining means and said prescribed key for retrieving the stored area code upon the determination that said digits input comprises an incomplete long distance number; and
   (g) means for automatically dialing the retrieved area code in correct sequence with respect to said digit input to complete and output the long distance number.

19. The arrangement according to claim 18, wherein the prescribed key is a manual key.

20. The arrangement according to claim 18, wherein the arrangement includes voice-recognition means, and wherein said prescribed key is a voice-recognizable word or words.

21. The arrangement according to claim 18, wherein said first and/or second determining means include means for detecting the presence of a long distance access digit.

22. The arrangement according to claim 21, wherein said means for detecting the presence of a long distance access digit detects whether the long distance access digit is the first digit entered.

23. The arrangement according to claim 18, wherein the determining means includes counter means for counting the number of digits entered.

24. The arrangement according to claim 18, further including means for detecting hold-down of said prescribed key.

25. The arrangement according to claim 18, further including means for detecting dual or multiple actuations of said prescribed key.

26. The arrangement according to claim 18, wherein the arrangement further includes a send key, and wherein said prescribed key is said send key.

27. The arrangement according to claim 18, wherein the arrangement further includes at least one line key, and wherein said prescribed key is said line key.

28. The arrangement according to claim 18, wherein the arrangement further includes two or more second keys, and wherein said prescribed key is a second or alternate send key.

29. The arrangement according to claim 18, wherein said prescribed key is a dedicated key.

30. The arrangement according to claim 18, further including means for independently displaying the stored area code visually.

31. The arrangement according to claim 18, further including means for annunciating the stored area code audibly.

32. The arrangement according to claim 18, further including second or further prescribed key means associated with second or further area code storage means.

33. The arrangement according to claim 32, wherein the contents of any said storage means is changeable.

34. The arrangement according to claim 32, wherein the contents of any said storage means is predetermined and fixed.

35. The arrangement according to claim 18, wherein the arrangement is part of a cellular station.

36. The arrangement according to claim 18, wherein the arrangement is part of a facsimile machine.

37. A telecommunications terminal, comprising:
 (a) entry means for entering digits;
 (b) store-and-forward dialing means for temporarily storing the entered digits, and for subsequently transmitting said temporarily stored over a telecommunications channel; and
 (c) actuatable key means operative, in one mode of operation, for initiating the transmission of the temporarily stored digits over the telecommunications channel and, in another mode of operation, for performing a different local function at the terminal.

38. The terminal according to claim 37, wherein the terminal is a cellular station, and wherein the multi-function key means includes a send key operative, in said one mode, for initiating said transmission, and, in said other mode, for retrieving a group of temporarily stored digits, which group is indicative of an area code or area code and long-distance access digit(s) for a long distance call.

39. The terminal according to claim 38, wherein the multi-function key means includes means for detecting a single actuation of the send key to signify said one mode, and second or further actuations of the send key to signify said other mode.

40. The terminal according to claim 38, wherein the multi-function key means includes means for detecting a single actuation of the send key to signify said one mode, and a hold-down actuation of the send key to signify said other mode.

41. The terminal according to claim 37, wherein the terminal is a line key station, and wherein the multi-function key means includes a line key operative, in said one mode, for initiating said transmission, and in said other mode, for retrieving a group of temporarily stored digits, which group is indicative to an area code or area code and long distance access digit(s) for a long distance call.

42. The terminal according to claim 41, wherein the multi-function key means includes means for detecting a single actuation of the line key to signify said one mode, and second or further actuations of the line key to signify said other mode.

43. The terminal according to claim 41, wherein the multi-function key means includes means for detecting a single actuation of the line key to signify said one mode, and a hold-down actuation of the line key to signify said other mode.

44. In a system adapted for the dialing of telephone numbers, a method of accommodating automatic area code dialing, user-selected once per call, comprising the steps of:
 (a) initiating the placement of a telephone call;
 (b) keying-in digits;
 (c) determining that a long distance call is to be made; and
 (d) filling in an area code when the number of digits keyed-in is less than those required for a long distance call.

45. The method according to claim 44, further including the step of storing an area code when the number of digits keyed-in conforms to the number of digits required in placing a long distance call.

46. The method according to claim 45, wherein the number of digits required in placing a long distance call is at least ten digits.

47. The method according to claim 44, wherein said step of determining that a long distance call is to be made includes detecting a firs key actuation to determine if it is indicative of a long distance call.

48. The method according to claim 44, wherein the step of filling in said area occurs when said keyed-in digits are at least seven.

49. In a system adapted for the dialing of telephone numbers, a method of accommodating automatic area code dialing, user-selected once per call, comprising the steps of:
 (a) initiating the digits key-in mode of the system;
 (b) keying-in of the digit "1", indicating that a long distance call is to be made;
 (c) keying-in of digits comprising a telephone number;
 (d) actuating a prescribed key;
 (e) filling in a previously-stored area code when the number of digits keyed-in is less than those required for a long distance call; and
 (f) outputting said filled-in and keyed-in digits.

50. In a system adapted for the dialing of telephone numbers comprised of multiple digit categories consisting of first, second and third digit categories, a method of accommodating automatic digit dialing by the system comprising the steps of:
 (a) initiating the digits key-in mode of the system;
 (b) keying-in of said first digit category indicative of a long distance call;
 (c) keying-in said third digit category;
 (d) actuating a prescribed key;
 (e) system filling-in at least said second digit category upon the number of digits keyed-in being less than those required in placing a long distance call; and
 (f) system output of at least said first, second and third digit categories in ascending order.

51. The method according to claim 50, wherein the step of keying-in said first digit category includes detecting a key actuation to determine if the call is indicative of a long distance call.

52. The method according to claim 50, wherein the step of filling in of at least said second digit category includes monitoring the number of digits keyed-in.

53. The method according to claim 50, wherein the system is associated with a cellular telephone network and includes a cellular subset.

54. The method according to claim 53, wherein said cellular subset includes a send key, and wherein said prescribed key is said send key.

55. The method according to claim 50, wherein said first, second and third digit categories are the long distance access digit "1", the area code digits and the local telephone number digits, respectively.

56. In a system adapted for dialing telephone numbers comprised of multiple digit categories consisting of first, second and third digit categories, a method of accommodating automatic digit dialing, user-selected once per call, comprising the steps of:
 (a) initiating the digits key-in mode of the system;
 (b) keying-in said third digit category;
 (c) a prescribed key actuation in a prescribed manner;
 (d) system filling-in of at least said and second digit categories; and
 (e) system outputting of at least said first, second and third digit categories in ascending order.

57. The method according to claim 56, wherein the said first, second and third digit categories are the long distance access digit "1", the area code digits and the local telephone numbers digits, respectively.

58. A method of abbreviated dialing of digits, user-selected once per call, in an apparatus adapted to output telephone number digits to a communications network, said telephone numbers including a previously stored first group of digits and a second group of digits, said method comprising the steps of:
 (a) initiating a digits key-in sequence of said apparatus;
 (b) keying-in said second group of digits;
 (c) a prescribed actuation of a prescribed key;
 (d) outputting said previously stored first group of digits to said communications network; and
 (e) outputting said second group of digits to said communications network.

59. Apparatus for dialing telephone numbers, keyed-in digits defining an outgoing call comprised of a first lead digits group followed by a second digit group, said apparatus comprising: first digit count means for counting the number of digits keyed-in, and digit store means, wherein upon the number of said keyed-in digits conforming to a predetermined total number of digits, said count means automatically and transparently effecting the storage of said lead digits in said digit store means.

60. Apparatus for automatic area code dialing, user-selected once per call, in the placement of calls, comprising:
 (a) first storage means having a first stored area code stored therein; and
 (b) means responsive to a prescribed actuation of a prescribed key for outputting said stored area code digits and a sequence of keyed-in digits in the placement of a long distance call, as combined, whereby said long distance call is completed.

61. Apparatus for automatic area code dialing, operatively associated with a cellular subset having a send key, said apparatus comprising:
 (a) key actuation count means;
 (b) first storage means having a first stored area code stored therein; and
 (c) means responsive to a prescribed actuation of a prescribed key for outputting said stored area code digits and a sequence of keyed-in digits in the placement of a long distance call, as combined, whereby said long distance call is completed, wherein said prescribed key is the send key, wherein said prescribed actuation is comprised of a successive dual actuation of the send key following said key-in of said sequence of digits, and wherein said count means operates to detect said dual actuation of said send key.

62. Apparatus for automatic area code dialing, operatively associated with a cellular subset having a send key, said apparatus comprising:
 (a) key actuation count means;
 (b) first storage means having a first stored area code stored therein; and
 (c) means responsive to a prescribed actuation of a prescribed key for outputting said stored area code digits and a sequence of keyed-in digits in the placemnt of a long distance call, as combined, whereby said long distance call is completed, wherein sid prescribed key is the send key, wherein said prescribed actuation said comprised of a key hold-down actuation of said send key following saidkey-in of said sequence of digits, and wherein said hold-down count means operates to detect said hold-down actuation of said send key.

63. Apparatus for automatic area code dialing, operatively associated with a key telephone subset having line keys, said apparatus comprising:
 (a) key actuation count means;
 (b) first storage means having a first stored area code stored therein; and
 (c) means responsive to a prescribed actuation of a prescribed key for outputting said stored area code digits in the placement of a long distance call, wherein said prescribed key is a line key, wherein said prescribed actuation is comprised of a successive dual actuation of a line key in advance of said key-in, and wherein said count means operates to detect said dual actuation of said line key.

64. Apparatus for automatic area code dialing, operatively associated with a key telephone subset having line keys, said apparatus comprising:
 (a) key hold-down means;
 (b) first storage means having a first stored area code stored therein; and
 (c) means responsive to a prescribed actuation of a prescribed key for outputting said stored area code digits in the placement of a long distance call, wherein said prescribed key is a line key, wherein said prescribed actuation is comprised of a key hold-down of a line key in advance of said key-in, and wherein said hold-down means operates to detect said hold-down actuation of said line key.

65. Apparatus according to claim 60, further comprising second storage means having a second area code stored therein, and further comprising means for detecting a key-in of the long distance access digit "1" as the first digit keyed-in, wherein upon key-in of said first digit "1" and upon prescribed actuation of a prescribed key, instead of said first stored area code, said second stored area code is outputted together with said sequence of keyed-in digits to complete said long distance call.

66. Apparatus according to claim 65, wherein said second stored area code is the "800" area code.

67. Apparatus for automatic area code dialing, said apparatus comprising:
 (a) key hold-down means;

(b) first storage means having a first stored area code stored therein; and
(c) means responsive to a prescribed actuation of a prescribed key for outputting said stored area code digits in the placement of a long distance call, wherein said prescribed key is the key for the long distance access digit "1", wherein said prescribed actuation is comprised of a key hold-down actuation of said digit "1", and wherein said hold-down count means operates to detect said hold-down actuation of said digit "1".

* * * * *